US012688723B2

(12) United States Patent
Zhu et al.

(10) Patent No.: US 12,688,723 B2
(45) Date of Patent: Jul. 21, 2026

(54) DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Lingzi Zhu, Shenzhen (CN); Lianyang Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 378 days.

(21) Appl. No.: 18/232,098

(22) Filed: Aug. 9, 2023

(65) Prior Publication Data

US 2023/0386238 A1      Nov. 30, 2023

Related U.S. Application Data

(63) Continuation of application No. PCT/CN2022/111609, filed on Aug. 11, 2022.

(30) Foreign Application Priority Data

Sep. 22, 2021    (CN) .......................... 202111106186.5

(51) Int. Cl.
*G06T 7/50*        (2017.01)
*G06F 40/30*       (2020.01)
                   (Continued)

(52) U.S. Cl.
CPC .......... *G06V 30/1918* (2022.01); *G06F 40/30* (2020.01); *G06T 7/50* (2017.01);
                   (Continued)

(58) Field of Classification Search
CPC ........... G06V 30/1918; G06V 30/1801; G06V 30/18133; G06V 30/19173; G06V 30/20;
                   (Continued)

(56) References Cited

U.S. PATENT DOCUMENTS

| | | | |
|---|---|---|---|
| 2008/0082497 A1* | 4/2008 | Leblang | ................ G06F 16/951 |
| 2013/0304469 A1 | 11/2013 | Kamada et al. | |
| 2021/0081729 A1 | 3/2021 | Huang et al. | |

FOREIGN PATENT DOCUMENTS

| | | |
|---|---|---|
| CN | 109816039 A | 5/2019 |
| CN | 110795657 A | 2/2020 |

(Continued)

OTHER PUBLICATIONS

Cognitive Representation Learning of Self-Media Online Article Quality (Year: 2020).*

(Continued)

*Primary Examiner* — Huo Long Chen
(74) *Attorney, Agent, or Firm* — Morgan, Lewis & Bockius LLP

(57) ABSTRACT

This application discloses a data processing method and apparatus, a computer device, and a non-transitory computer-readable storage medium in the technical field of computers. This application, for textual data and picture data of an article, extracts a textual feature and a picture feature, respectively, and predicts an article classification to which the article belongs using a cross-modal interaction feature between the textual feature and picture feature. At the same time, this application considers the contribution degree of each of a textual modality and a picture modality to the article classification, rather than determining from a textual perspective only. In addition, the extracted cross-modal interaction feature is not a simple concatenation of the textual feature and the picture feature, which can reflect richer and deeper inter-modal interaction information, and greatly improve the identification accuracy of the article classification. Furthermore, it can improve the discovering accuracy of high-quality articles in the scene of identifying high-quality articles.

19 Claims, 10 Drawing Sheets

(51) Int. Cl.

| | | |
|---|---|---|
| *G06V 30/18* | (2022.01) |
| *G06V 30/19* | (2022.01) |
| *G06V 30/20* | (2022.01) |

(52) U.S. Cl.

CPC .... *G06V 30/1801* (2022.01); *G06V 30/18133* (2022.01); *G06V 30/19173* (2022.01); *G06V 30/20* (2022.01); *G06T 2207/30176* (2013.01)

(58) Field of Classification Search

CPC .... G06V 10/82; G06V 30/413; G06V 10/806; G06V 30/412; G06F 40/30; G06F 40/216; G06F 40/284; G06F 40/289; G06F 16/383; G06F 16/583; G06F 40/126; G06F 40/258; G06T 7/50; G06T 2207/30176; G06N 3/0464; G06N 3/04; G06N 3/0499; G06N 3/08; G06N 20/00

See application file for complete search history.

(56) References Cited

FOREIGN PATENT DOCUMENTS

| | | | | |
|---|---|---|---|---|
| CN | 111942407 | A | * 11/2020 | ............. G06N 3/044 |
| CN | 111985369 | A | 11/2020 | |
| CN | 112231497 | A | 1/2021 | |
| CN | 112559683 | A | 3/2021 | |
| CN | 112784092 | A | 5/2021 | |
| CN | 112989097 | A | 6/2021 | |
| CN | 113297485 | A | 8/2021 | |
| CN | 116434000 | A | 7/2023 | |
| WO | WO 2007114796 | A1 | 10/2007 | |

OTHER PUBLICATIONS

Tencent Technology, WO, PCT/CN2022/111609, Nov. 9, 2022, 4 pgs.

Tencent Technology, IPRP, PCT/CN2022/111609, Mar. 26, 2024, 5 pgs.

Tencent Technology, Extended European Search Report, EP Patent Application No. 22871663.5, Sep. 12, 2024, 8 pgs.

Yiru Wang et al., "Cognitive Representation Learning of Self-Media Online Article Quality", MM '20: Proceedings of the 28th ACM International Conference on Multimedia, DOI: 10.1145/3394171.3413747, Oct. 2020, 9 pgs.

Tencent Technology, ISR, PCT/CN2022/111609, Nov. 9, 2022, 2 pgs.

* cited by examiner

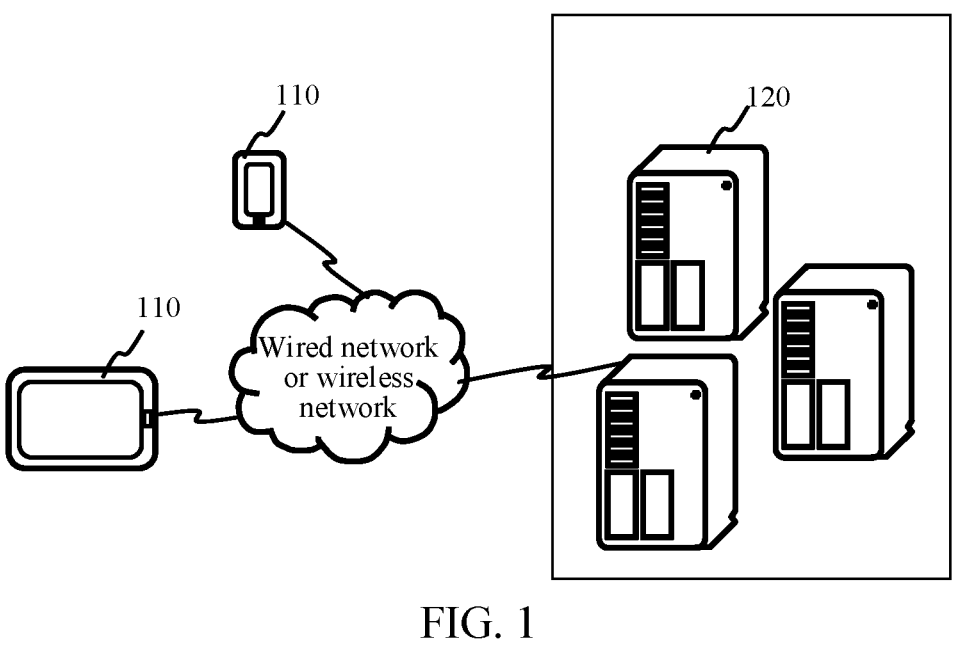

FIG. 1

| A server acquires a textual feature and a picture feature of an article, the textual feature being used for characterizing textual data in the article, and the picture feature being used for characterizing picture data in the article | 201 |

| The server determines a first interaction feature for the textual feature based on a partial feature associated with the textual feature in the picture feature, the first interaction feature being used for characterizing the textual feature fused with the picture feature | 202 |

| The server determines a second interaction feature for the picture feature based on a partial feature associated with the picture feature in the textual feature, the second interaction feature being used for characterizing the picture feature fused with the textual feature | 203 |

| The server obtains a cross-modal interaction feature by fusing the first interaction feature and the second interaction feature | 204 |

| The server determines an article classification to which the article belongs based on the cross-modal interaction feature | 205 |

FIG. 2

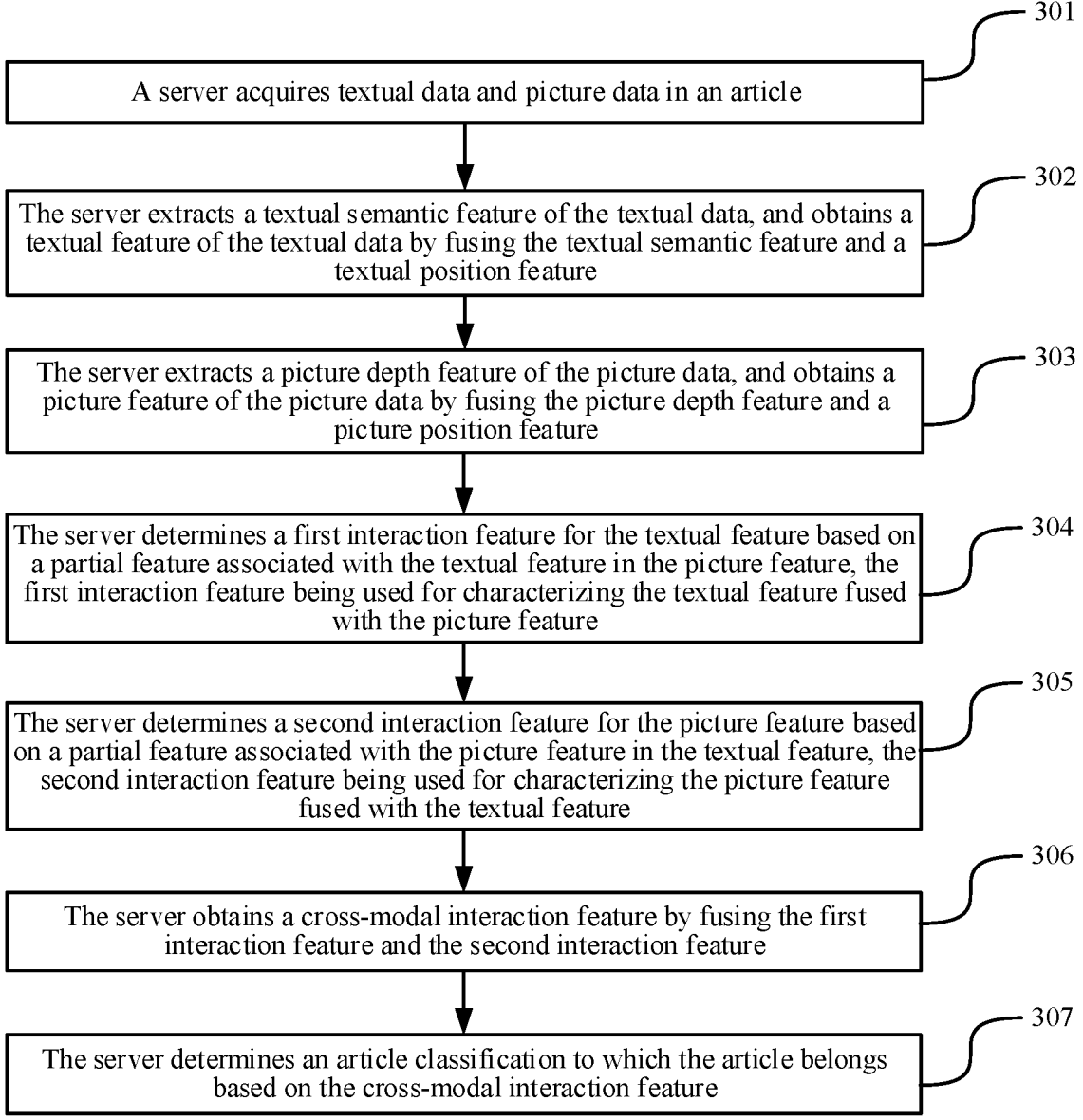

301

A server acquires textual data and picture data in an article

302

The server extracts a textual semantic feature of the textual data, and obtains a textual feature of the textual data by fusing the textual semantic feature and a textual position feature

303

The server extracts a picture depth feature of the picture data, and obtains a picture feature of the picture data by fusing the picture depth feature and a picture position feature

304

The server determines a first interaction feature for the textual feature based on a partial feature associated with the textual feature in the picture feature, the first interaction feature being used for characterizing the textual feature fused with the picture feature

305

The server determines a second interaction feature for the picture feature based on a partial feature associated with the picture feature in the textual feature, the second interaction feature being used for characterizing the picture feature fused with the textual feature

306

The server obtains a cross-modal interaction feature by fusing the first interaction feature and the second interaction feature

307

The server determines an article classification to which the article belongs based on the cross-modal interaction feature

FIG. 3

Picture A

XXX will take on YYY later this year before turning its attention to ZZZ. The two have struck a sensational two-war agreement in 2021.

Picture B

The 30-year-old XXX competed professionally again in October 2013, a year after winning a gold medal at an Olympic Games in 2012.

Picture C

Absolute position description of a picture-textual sequence

Textual sequence{1,3,5,7,8}
Picture sequence{0,2,4,6}

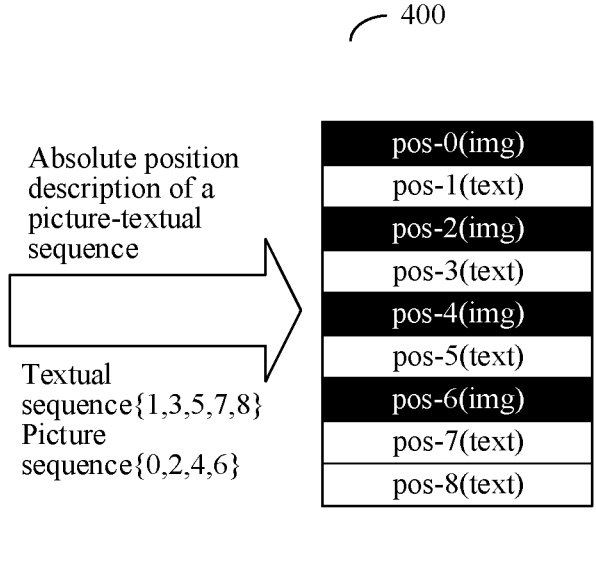

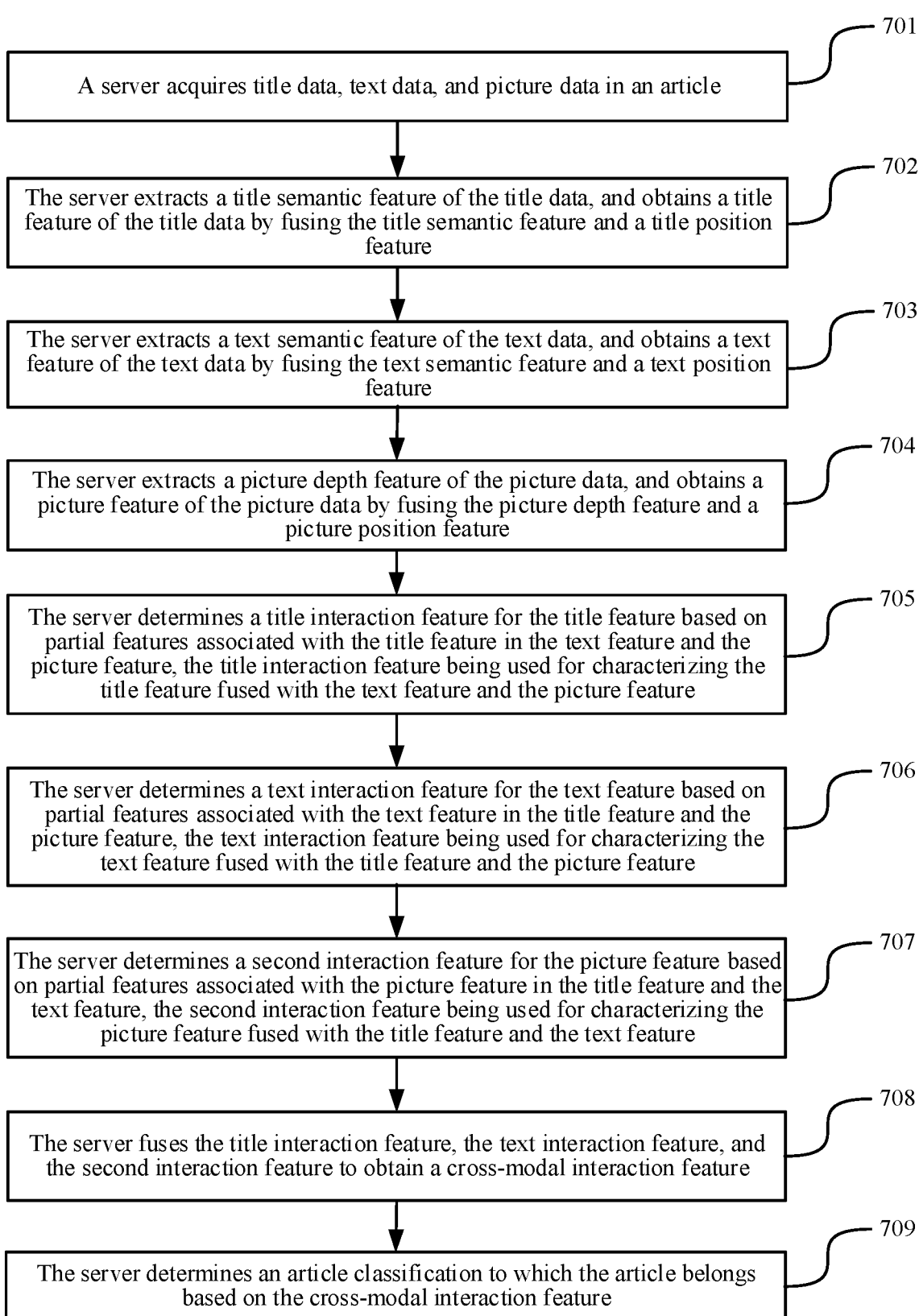

701

A server acquires title data, text data, and picture data in an article

702

The server extracts a title semantic feature of the title data, and obtains a title feature of the title data by fusing the title semantic feature and a title position feature

703

The server extracts a text semantic feature of the text data, and obtains a text feature of the text data by fusing the text semantic feature and a text position feature

704

The server extracts a picture depth feature of the picture data, and obtains a picture feature of the picture data by fusing the picture depth feature and a picture position feature

705

The server determines a title interaction feature for the title feature based on partial features associated with the title feature in the text feature and the picture feature, the title interaction feature being used for characterizing the title feature fused with the text feature and the picture feature

706

The server determines a text interaction feature for the text feature based on partial features associated with the text feature in the title feature and the picture feature, the text interaction feature being used for characterizing the text feature fused with the title feature and the picture feature

707

The server determines a second interaction feature for the picture feature based on partial features associated with the picture feature in the title feature and the text feature, the second interaction feature being used for characterizing the picture feature fused with the title feature and the text feature

708

The server fuses the title interaction feature, the text interaction feature, and the second interaction feature to obtain a cross-modal interaction feature

709

The server determines an article classification to which the article belongs based on the cross-modal interaction feature

FIG. 7

DATA PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/111609, entitled "DATA PROCESSING METHOD AND APPARATUS, COMPUTER DEVICE, AND STORAGE MEDIUM" filed on Aug. 11, 2022, which claims priority to Chinese Patent Application No. 2021111061865, entitled "DATA PROCESSING METHOD AND APPARATUS, COMPUTER DEVICE, AND STORAGE MEDIUM", filed on Sep. 22, 2021 with China National Intellectual Property Administration, all of which is incorporated by reference herein in its entirety.

FIELD OF THE TECHNOLOGY

This application relates to the technical field of computers, and in particular, to data processing technology.

BACKGROUND OF THE DISCLOSURE

With the development of computer technology, the task of discovering high-quality articles has gradually become a research hotspot. Through this task, high-quality articles can be discovered and pushed to users to improve their reading experience. Currently, the task of discovering the above high-quality articles is usually performed by determining the content quality of the articles from the perspective of texts (without considering the contribution of pictures to the content quality), or by concatenating the embedding features of texts and pictures, and determining whether they are high-quality articles based on the features obtained from the concatenation.

In the above process, whether it is to determine the content quality from the perspective of texts, or to determine the content quality by using the concatenated features of texts and pictures, the discovering accuracy of high-quality articles needs to be improved.

SUMMARY

The embodiments of this application provide a data processing method and apparatus, a computer device, and a non-transitory computer-readable storage medium, which can improve the identification accuracy of an article classification, thereby improving the discovering accuracy of high-quality articles. The technical solutions are as follows:

In one aspect, a method is performed by a computer device, the method including:

acquiring a textual feature and a picture feature of an article, the textual feature characterizing textual data in the article, and the picture feature characterizing picture data in the article;

determining a first interaction feature for the textual feature based on a partial feature associated with the textual feature in the picture feature;

determining a second interaction feature for the picture feature based on a partial feature associated with the picture feature in the textual feature;

obtaining a cross-modal interaction feature by fusing the first interaction feature and the second interaction feature; and determining an article classification to which the article belongs based on the cross-modal interaction feature.

In one aspect, a computer device is provided, the computer device including one or more processors and one or more memories, the one or more memories storing therein at least one computer program, and the at least one computer program being loaded and executed by the one or more processors and causing the computer device to implement the data processing method according to any one of the above possible implementations.

In one aspect, a non-transitory computer-readable storage medium is provided, the storage medium storing therein at least one computer program, the at least one computer program being loaded and executed by a processor of a computer device and causing the computer device to implement the data processing method according to any one of the above possible implementations.

The advantageous effects brought by the technical solutions provided by the embodiments of this application at least include:

The method, for textual data and picture data of an article, extracts a textual feature and a picture feature, respectively, and predicts an article classification to which the article belongs using a cross-modal interaction feature between the textual feature and picture feature. At the same time, the method considers the contribution degree of each of the textual modality and the picture modality to the article classification, rather than determining from a textual perspective only. In addition, the extracted cross-modal interaction feature is not a simple concatenation of the textual feature and the picture feature, which can reflect richer and deeper inter-modal interaction information, and help to improve the identification accuracy of the article classification. Furthermore, it can improve the discovering accuracy of high-quality articles in the scene of identifying high-quality articles.

BRIEF DESCRIPTION OF THE DRAWINGS

FIG. 1 is a diagram showing an implementation environment of a data processing method provided by an embodiment of this application.

FIG. 2 is a flowchart of a data processing method provided by an embodiment of this application.

FIG. 3 is a flowchart of a data processing method provided by an embodiment of this application.

FIG. 4 is a diagram showing rationality of extracting position information provided by an embodiment of this application.

FIG. 7 is a flowchart of a data processing method provided by an embodiment of this application.

DESCRIPTION OF EMBODIMENTS

Figure 5:
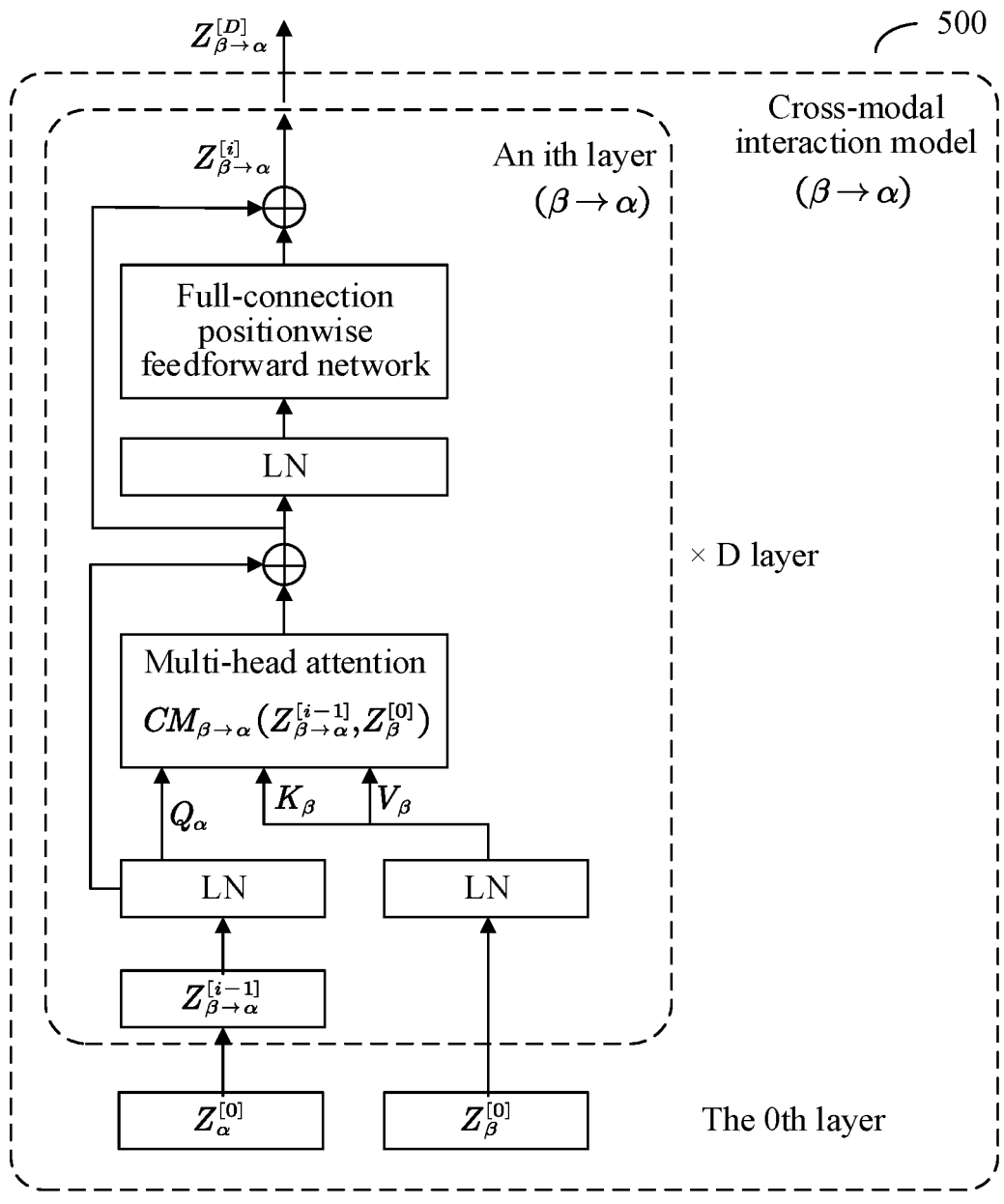
FIG. 5 is a diagram showing rationality of a cross-modal interaction model provided by an embodiment of this application.

In order to make the objects, technical solutions, and advantages of this application clearer, embodiments of this application will be further described in detail below with reference to the drawings.

In this application, the terms "the first", "the second", and the like are used to distinguish the same or similar items performing substantially the same function. It is to be understood that the terms "the first", "the second", and "an $n^{th}$" neither have a logical or chronological dependency on each other nor limit the number and execution order.

In this application, the term "at least one" means one or more, and the meaning of "a plurality of" means two or more, for example, a plurality of first positions means two or more first positions.

The solution, provided by the embodiments of this application, relates to technologies such as machine learning of artificial intelligence, and in particular to, multi-modal machine learning (MMML) technologies. The terms of MMML are illustrated as follows:

Modality: Each source or form of information may be referred to as a modality. For example, people have touch, hearing, sight, and smell. The media of information include voice, video, text, and the like. A wide variety of sensors, such as radar, infrared, and accelerometers, may each be referred to as a modality. At the same time, a modality can also have a very broad definition, for example, two different languages are considered as two modalities, and even the data sets collected in two different situations can also be considered as two modalities. In an embodiment of this application, an article is divided into two modalities of texts and pictures, or three modalities of titles, the text, and pictures.

MMML: MMML, referred to as multi-modal learning, aims to realize functions of processing and understanding multi-source modal information through machine learning. Monomodal refers to a single modality, and a multimodal refers to a combination of two or more modalities in various forms. The popular research direction is multi-modal learning between image, video, audio, and semantics. Overall, multi-modal learning is divided into such research directions as multi-modal representation learning, modal transformation, alignment, multi-modal fusion, collaborative learning, and the like. Unimodal representation learning is responsible for representing information as a numerical vector processable by a computer, or further abstracting the information as a higher-level feature vector. Multi-modal representation learning refers to learning a better feature representation by exploiting the complementarity between multiple modalities and eliminating the redundancy between modalities.

Multi-modal fusion: Multi-modal fusion, as a research direction of multi-modal learning, is responsible for combining the information of a plurality of modalities to perform target prediction (classification or regression), which belongs to one of the earliest research directions of MMML and is the most widely used direction at present. There are other common aliases in multi-modal fusion, such as multi-source information fusion and multi-sensor fusion. In an embodiment of this application, it involves a two-modal fusion of a textual modality and a picture modality in an article. Since the textual modality may be divided into a title modality and a text modality, it may also involve a three-modal fusion of a title modality, a text modality, and a picture modality.

Picture-textual quality: From the perspective of the article content itself, the detection of high-quality articles with both content quality and reading experience can help the recommendation side better understand and apply the exported articles of the content center (that is, picture-textual content). In some embodiments, when comprehensively evaluating the content quality of articles, it can be modeled from the dimensions of picture-textual multi-modal integration, article typesetting experience, atomic characteristics of accounts, and the like, to finally complete the identification of high-quality articles.

Relative position encoding (RPE): RPE refers to a position encoding mode in the Transformer model. The Transformer model has two modes in position encoding, including: absolute position encoding and relative position encoding. Absolute position encoding is a position encoding mode commonly used at present, namely, a position vector is initialized randomly on characters of different positions directly and added to an input character vector sequence to input a model as a parameter for training. When using absolute position encoding, the position vectors corresponding to the characters at different positions are certainly different, but the relative meanings of the characters at different positions cannot be explicitly obtained by absolute position encoding. For example, a distance between position 1 and position 2 is closer than that between position 3 and position 10, and distances between position 1 and position 2, and position 3 and position 4 are both 1. The relative relationship between positions can only be implicitly learned using absolute position encoding. In the embodiment of this application, the feature representation of the relative relationship between positions can be enhanced by introducing relative position encoding.

FIG. 1 is a diagram showing an implementation environment of a data processing method provided by an embodiment of this application. Referring to FIG. 1, the implementation environment includes a terminal 110 and a server 120, the terminal 110 and the server 120 being both an example of a computer device.

The terminal 110 is configured to support a user to browse various types of articles including picture-textual contents. For example, the articles include but are not limited to web information, public account tweets, blogs, microblogs, and the like. The embodiments of this application do not specifically define the types of articles. An application supporting browsing articles is installed and run on the terminal 110. For example, the application can be a browser application, a social application, a picture-textual information application, a news viewing application, and the like. The embodiments of this application do not specifically define the type of the application. Schematically, a user launches an application on the terminal 110 through which the user can browse high-quality articles pushed by the server 120. In some embodiments, the terminal 110 may be, but is not limited to, a smart phone, a tablet, a laptop, a desktop computer, a smart speaker, a smart watch, and the like.

The terminal 110 and the server 120 may be directly or indirectly connected through wired or wireless communication, and this application is not limited thereto.

The server 120 is configured to identify and push high-quality articles, that is, the server 120 is configured to provide background services to the application installed on the terminal 110. Schematically, the server 120 collects the articles published by the author within the platform, extracts a title, a text and a picture in the articles, and determines whether the corresponding article is a high-quality one according to the corresponding title feature, textual feature and picture feature, and increases the recommendation weight for the identified high-quality article in the recommendation phase, so that the high-quality article is more likely to be pushed to the terminal 110 used by the user.

In some embodiments, the server 120 includes at least one of a server, a plurality of servers, a cloud computing platform, or a virtualization center. For example, the server 120 undertakes the primary computing work, and the terminal 110 undertakes the secondary computing work. Alternatively, the server 120 undertakes the secondary computing work, and the terminal 110 undertakes the primary computing work. Alternatively, the terminal 110 and the server 120 may perform cooperative computing using a distributed computing architecture.

In some embodiments, a server may be an independent physical server, or a server cluster or distributed system composed of a plurality of physical servers, or a cloud server providing basic cloud computing services such as cloud services, cloud databases, cloud computing, cloud functions, cloud storage, network services, cloud communications, middleware services, domain name services, security services, content delivery network (CDN), and large data and artificial intelligence platforms.

Those skilled in the art will appreciate that the number of the above terminals 110 may be more or less. For example, the above terminal 110 may be only one, or the above terminal 110 may be dozens or hundreds, or more. The embodiments of this application do not limit the number and device type of the terminals 110.

FIG. 2 is a flowchart of a data processing method provided by an embodiment of this application. With reference to FIG. 2, the embodiment is performed by a computer device, illustrated with the computer device as a server, including the following steps:

Step 201: The server acquires a textual feature and a picture feature of an article, the textual feature being used for characterizing textual data in the article, and the picture feature being used for characterizing picture data in the article.

The above articles refer to any article of to-be-determined article classifications, and the types of articles include but are not limited to web information, public account tweets, blogs, microblogs, and the like. The embodiments of this application do not specifically define the types of articles.

A server is an exemplary illustration of a computer device, including at least one of a server, a plurality of servers, a cloud computing platform, or a virtualization center. The embodiments of this application only take the computer device as the server to illustrate, that is, to complete the type identification of the article on the server side, for example, to identify whether the article is a high-quality article. In some embodiments, the step for the type identification of the article can also be deployed on the terminal side, for example, the terminal independently identifies whether the article is a high-quality article.

In some embodiments, the server obtains the article. In some embodiments, the article may be an article stored in an article database. Alternatively, the article may be an article newly uploaded by a terminal to a server. Alternatively, the article may be an article downloaded from a distributed file system. The embodiments of this application do not specifically define the sources of to-be-determined articles.

In the scenario of identifying a high-quality article, if textual content and textual quality of the two articles are similar, but the picture quality of the two articles is different, the picture quality of the two articles will affect the determination result of whether the two articles are high-quality articles. It can be seen that in addition to the textual modality, the picture modality, that is, the visual modal, will also affect the identification result of the high-quality article. Therefore, in the embodiment of this application, in addition to the textual modality, a picture modality is also introduced to comprehensively utilize multi-modal data to accurately identify high-quality articles.

In some embodiments, after acquiring the article, the server extracts the textual data and the picture data in the article separately because the text and the picture have different features with different feature extraction modes. The above process can be viewed as an extraction process for multi-modal data in the article. In some embodiments, it can be divided into a textual modality and a picture modality only, which can reduce the computational complexity of multi-modal fusion.

In some embodiments, if it is divided into two modalities of a textual modality and a picture modality only, the server may separately extract a textual semantic feature of the textual data and a picture depth feature of the picture data, to obtain the textual feature by fusing the textual semantic feature and a textual position feature, and to obtain the picture feature by fusing the picture depth feature and a picture position feature.

In the above process, for the data of the two different modalities, namely, the textual modality and picture modality, feature extraction can be targeted in different ways, to obtain the textual feature and the picture feature. In addition, since position-related information is fused in each of the textual feature and the picture feature, different features can be presented in response to the same texts or pictures appearing in different positions in the article, thereby improving the expression ability of each of the textual feature and the picture feature.

In some embodiments, since a title and a text in the texts also have different features, the server may further separately extract title data and text data in extracting the textual data, to introduce more and richer feature information, namely, dividing into three modalities of a title modality, a text modality, and a picture modality, to improve the identification accuracy of the overall article classification.

In some embodiments, if divided into three modalities of a title modality, a text modality, and a picture modality, the server separately extracts a title semantic feature of the title data, a text semantic feature of the text data, and a picture depth feature of the picture data. Then the server fuses the title semantic feature and a title position feature to obtain the title feature, fuses the text semantic feature and a text position feature to obtain the textual feature, and fuses the picture depth feature and a picture position feature to obtain the picture feature.

In the above process, for the data of the three different modalities, namely, the title modality, the text modality, and the picture modality, feature extraction can be targeted in different ways, to obtain the title feature, the textual feature, and the picture feature. In addition, since position-related information is fused in each of the title feature, the textual feature, and the picture feature, different features are presented in response to the same title, text, or picture appearing in different positions in the article, thereby improving the expression ability of each of the title feature, the textual feature, and the picture feature.

In some embodiments, the above position features, such as the textual position feature, the picture position feature, the title position feature, and the text position feature, may all be absolute position features obtained by using an absolute position encoding mode, which can simplify the training process of multi-modal fusion.

In some embodiments, the above position features, such as the textual position feature, the picture position feature, the title position feature, and the text position feature, may all be relative position features obtained by using a relative position encoding mode. The relative position features are used for characterizing the sequence and distance between the corresponding textual data and picture data, or characterizing the sequence and distance between the corresponding title data, text data, and picture data. In the next embodiment, the relative position encoding mode of the relative position features will be described in detail, which will not be repeated here.

Step 202: The server determines a first interaction feature for the textual feature based on a partial feature associated with the textual feature in the picture feature, the first interaction feature being used for characterizing the textual feature fused with the picture feature.

In some embodiments, for the case of the fusion of the textual modality and picture modality, the server may, taking the textual modality as a main modality, receive auxiliary information about the picture modality, for example, to acquire the partial feature associated with the textual feature in the picture feature and on this basis, to acquire the first interaction feature.

In some embodiments, for the case of the fusion of the title modality, text modality, and picture modality, the first interaction feature includes a title interaction feature and a text interaction feature. In some embodiments, the server may, taking the title modality as a main modality, receive respective auxiliary information about the text modality and picture modality, for example, to acquire partial features associated with the title feature in the textual feature and picture feature and on this basis, to acquire the title interaction feature. In addition, the server may, taking the text modality as a main modality, receive respective auxiliary information about the title modality and the picture modality, for example, to acquire partial features associated with the textual feature in the title feature and picture feature and on this basis, to acquire the text interaction feature.

Step 203: The server determines a second interaction feature for the picture feature based on a partial feature associated with the picture feature in the textual feature, the second interaction feature being used for characterizing the picture feature fused with the textual feature.

In some embodiments, for the case of the fusion of the textual modality and picture modality, the server may, taking the picture modality as a main modality, receive auxiliary information about the textual modality, for example, to acquire the partial feature associated with the picture feature in the textual feature and on this basis, to acquire the second interaction feature.

In some embodiments, for the case of the fusion of the title modality, text modality, and picture modality, the server may, taking the picture modality as a main modality, receive respective auxiliary information about the title modality and the text modality, for example, to acquire partial features associated with the picture feature in the title feature and textual feature and on this basis, to acquire the second interaction feature.

Step 204: The server obtains a cross-modal interaction feature by fusing the first interaction feature and the second interaction feature.

In some embodiments, the cross-modal interaction feature acquired in the above step 204 refers to the information obtained by fusing the features of multi-modal data each with reference to other modal data, so that the cross-modal interaction feature can strengthen the correlation between the textual data and the picture data. For each modality in the multiple modalities, it will be used as a main modality to receive the auxiliary of other modalities and obtain a cross-modal feature. The cross-modal feature corresponding to each modality is fused to obtain a final cross-modal interaction feature.

For the case of the fusion of the textual modality and picture modality, the server may directly fuse the first interaction feature and the second interaction feature to obtain the final cross-modal interaction feature.

In the above process, for an article, since the expression modes of a textual modality and a picture modality are different, there may be a phenomenon of cross (namely, information redundancy) or complementarity (namely, containing more information than a mono-modal feature) between a textual feature and a picture feature. In summary, the significant features of multi-modal data are redundancy and complementarity, and even there may be a plurality of different information interactions between modalities. Therefore, multi-modal data in an article can be reasonably processed by taking a textual modality as a main modality to extract a first interaction feature and taking a picture modality as a main modality to extract a second interaction feature, obtaining more rich interaction features.

For the case of the fusion of the title modality, text modality, and picture modality, the server may fuse the title interaction feature, the text interaction feature, and the second interaction feature to obtain the final cross-modal interaction feature.

In the above process, an article is divided into three modalities, namely, a title modality, a text modality, and a picture modality, with a directed cross-modal attention interaction through a pair-wise combination, where each modal, acting as a main modality, receives auxiliary information about the other two modalities, and finally obtains cross-modal interaction features through fusion. Since more modal interaction information is introduced than the two-modal fusion, it is more helpful to improve the identification accuracy of a high-quality article.

Step 205: The server determines an article classification to which the article belongs based on the cross-modal interaction feature.

In some embodiments, the server performs full-connection processing on the cross-modal interaction feature to obtain a full-connection feature. The server performs exponential normalization on the full-connection feature to obtain a probability prediction result of the article, where the probability prediction result includes a plurality of prediction probabilities corresponding to a plurality of classifications, namely, the probability prediction result characterizes the plurality of prediction probabilities of the article belonging to the plurality of classifications. Furthermore, a classification corresponding to the prediction probability meeting a target condition is determined as an article classification to which the article belongs.

In some embodiments, the server inputs the cross-modal interaction feature into a full-connection layer or a full-connection network, outputs the full-connection feature, and then maps the full-connection feature using an exponential normalized Softmax function to obtain the prediction probability of the article belonging to each classification. Further, the server selects a prediction probability meeting the target condition from all the prediction probabilities, and determines the classification corresponding to the prediction probability meeting the target condition as an article classification to which the article belongs.

In some embodiments, the target condition may be a maximum prediction probability, then the server may determine a maximum prediction probability from the plurality of prediction probabilities, and determine the classification corresponding to the maximum prediction probability as an article classification to which the article belongs. Alternatively, the server may rank the plurality of prediction probabilities in descending order, and select the classification corresponding to the prediction probability ranked first as an article classification to which the article belongs.

In some embodiments, the target condition may be that the prediction probability is greater than a probability threshold, then the server may determine each prediction probability greater than the probability threshold from the plurality of prediction probabilities, and randomly select a classification from the classifications corresponding to each prediction probability greater than the probability threshold as an article classification to which the article belongs. The prediction probability is any value greater than or equal to 0 and less than or equal to 1.

In some embodiments, the target condition may be a random selection of the prediction probabilities topK (K≥1), and then the server may rank the plurality of prediction probabilities in descending order, select K prediction probabilities ranked in the top K, and randomly select a classification from the K classifications corresponding to the K prediction probabilities as an article classification to which the article belongs. K is an integer greater than or equal to 1.

In the above process, an article classification to which an article belongs can be identified based on a multi-modal fusion mode combined with relative position encoding. In some embodiments, the article classification may be divided according to whether the article is of high quality, such as high-quality articles and non-high-quality articles. In some embodiments, the article classification may also be divided according to the field to which the main content of the article belongs, such as finance, entertainment, news, and science popularization. The embodiments of this application do not specifically define the division of the article classification.

In an exemplary scenario, the article classification is divided according to whether the article is of high quality, which is applicable in a scenario of identifying a high-quality article, that is, identifying high-quality picture-textual contents. For example, the article classification is divided into high-quality articles and non-high-quality articles, or high-quality articles, common articles, low-quality articles, and the like. The embodiments of this application do not specifically define the division of the article classification. In a high-quality article identification scenario, cross-modal interaction information between adjacent picture-text (that is, texts and pictures with similar positions) in the same article is very important. Texts in the articles are usually represented in the form of character sequences or sentence sequences, and pictures can also be arranged as picture sequences in a sequential order. Therefore, a sequence-level interaction can be achieved between a textual modality and a picture modality. By constructing a sequence-level multi-modal fusion network, interaction features between multiple modalities can be extracted by making full use of sequence-level interaction information between modalities in the case where the respective features of texts and pictures are not aligned before being put into a prediction process of the article classification to improve the identification accuracy of the article classification.

In an exemplary scenario, the article classification is divided according to the field to which the main content of the article belongs, which is applicable to a scenario in which accurate pushing is performed according to a user image. For example, the article classification is divided into finance, entertainment, news, science popularization, and the like. In some embodiments, in the application scenario, the server determines whether to recommend the article to the user based on the similarity between the cross-modal interaction feature of the article and user features of the user, to be able to recommend the article meeting the long-term preferences to the user. Alternatively, the server determines whether to recommend the article to the user based on the similarity between the cross-modal interaction feature of the article and historical reading average features of the user, in which the historical reading average features refer to the average features of the cross-modal interaction feature of historical articles read by the user within the last week (or within a specified time period such as one month and two months), to recommend articles meeting the recent preferences to the user.

All the above alternative technical solutions can be combined in any manner to form alternative embodiments of the present disclosure, which will not be repeated here.

The method provided by the embodiments of this application, for textual data and picture data of an article, extracts a textual feature and a picture feature, respectively, and predicts an article classification to which the article belongs using a cross-modal interaction feature between the textual feature and picture feature. At the same time, the method considers the contribution degree of each of the textual modality and the picture modality to the article classification, rather than determining from a textual perspective only. In addition, the extracted cross-modal interaction feature is not a simple concatenation of the textual feature and the picture feature, which can reflect richer and deeper inter-modal interaction information, and help to improve the identification accuracy of the article classification. Furthermore, it can improve the discovering accuracy of high-quality articles in the scene of identifying high-quality articles.

FIG. 3 is a flowchart of a data processing method provided by an embodiment of this application. With reference to FIG. 3, the embodiment is performed by a computer device, illustrated with the computer device as a server. For the case where a target article is only divided into two modalities, namely, a text modality and a picture modality, the embodiment of this application will describe in detail how to identify an article classification of an article based on a two-modal fusion mode, including the following steps:

Step 301: The server obtains textual data and picture data in the article.

The articles refer to any article of to-be-determined article classifications, and the types of articles include but are not limited to web information, public account tweets, blogs, microblogs, and the like. The embodiments of this application do not specifically define the types of articles.

In some embodiments, the server obtains the article. In some embodiments, the article is an article stored in an article database. Alternatively, the article is an article newly uploaded by a terminal to a server. Alternatively, the article is an article downloaded from a distributed file system. The embodiments of this application do not specifically define the source of articles.

In some embodiments, the server extracts the textual data and the picture data in the article separately because the text and the picture have different features with different feature extraction modes. The above process can be viewed as an extraction process for multi-modal data in the article. In some embodiments, it is divided into a textual modality and a picture modality only, which can reduce the computational complexity of multi-modal fusion.

Step 302: The server extracts a textual semantic feature of the textual data, and obtains the textual feature of the textual data by fusing the textual semantic feature and a textual position feature.

In some embodiments, the server may extract the textual semantic feature based on a textual encoding model configured to extract the textual semantic feature of the textual data, that is, the server inputs the textual data into the textual encoding model and encodes the textual data through the textual encoding model to obtain the textual semantic feature.

In some embodiments, a model structure of the textual encoding model includes, but is not limited to, any one or a combination of at least two of the following: bidirectional encoder representation from transformers (BERT, a translation model using a bidirectional encoding representation), Transformers (a classical translation model), embeddings from language models (ELMO, a language model using embedding processing), neural network language model (NNLM, a neural network language model), and the like. The embodiments of this application do not specifically define the model structure of the textual encoding model. For example, the textual encoding model is a BERT model to reduce the computational complexity of the feature extraction process. And for example, the textual encoding model is formed by cascading an encoder of the BERT model and a Transformer model.

Schematically, the embodiments take the textual encoding model being formed by cascading an encoder of the BERT model and the Transformer model as an example for illustration. Assuming that the textual data includes at least one sentence, the server performs word segmentation on each sentence to obtain at least one character included in each sentence, and arranges each character of each sentence according to the sequence in which it appears in the article to form a character sequence, and adds [SEP] as a sentence divider at the end of each sentence in the character sequence, and adds [CLS] as a classifier at the top of the character sequence. The sentence divider is used for breaking between adjacent sentences, and the classifier is used for characterizing the global semantic information of the whole character sequence.

The character sequence is input into a BERT model including an embedding layer and at least one bidirectional encoding layer. Each bidirectional encoding layer is configured to perform forward encoding and reverse encoding on an input signal, and the output of each bidirectional encoding layer serves as the input of the next bidirectional encoding layer, that is, each bidirectional encoding layers is connected in series. Each bidirectional encoding layer includes two parts, one part being an attention network, and the other part being a forward full-connection layer. Each hidden layer in the attention network is obtained by performing a weighted average on the hidden layers of the previous layer, so that each hidden layer can be directly associated with all the hidden layers of the previous layer. A hidden layer vector for characterizing global information can be obtained using the input long sequence information (namely, the character sequence). The forward full-connection layer is configured to further process the global information determined by the attention network to enhance the learning capability of the whole BERT model.

In some embodiments, the character sequence is input into an embedding layer of the BERT model firstly, and each character in the character sequence is embedded by the embedding layer, that is, mapping each character to an embedding space to obtain an embedding vector of each character, namely, to obtain an embedding vector sequence. Then, the embedding vector sequence is input into the at least one bidirectional encoding layer, through which each embedding vector in the embedding vector sequence is bidirectional encoded (including forward encoding and reverse encoding), and a semantic vector of each character is output, that is, a semantic vector sequence is obtained. Each character in the character sequence corresponds to an embedding vector in the embedding vector sequence, and each embedding vector in the embedding vector sequence corresponds to a semantic vector in the semantic vector sequence.

In the above process, forward encoding and reverse encoding are performed on the embedding vector sequence through a bidirectional encoding layer. Forward encoding enables the semantic vector corresponding to each character to fuse relevant information about characters appearing before the character, while reverse encoding enables the semantic vector corresponding to each character to fuse relevant information about characters appearing after the character. Two-way encoding operations can greatly improve the expression ability of the semantic vector of each character.

Illustrated is a first bidirectional encoding layer in which an attention network and a forward full-connection layer are included. The embedding vector sequence is input into an attention network of a first bidirectional encoding layer, and weighted through the attention network to extract an attention feature sequence of the embedding vector sequence. The attention feature sequence is input into a forward full-connection layer of the first bidirectional encoding layer, and performed bidirectional semantic encoding (including forward encoding and reverse encoding) through the forward full-connection layer to output an implicit vector sequence, inputting the implicit vector sequence into a second bidirectional encoding layer, and so on. The processing logic of subsequent bidirectional encoding layers is similar to the first bidirectional encoding layer, which will not be repeated here. Due to the introduction of the attention mechanism in the bidirectional encoding layer, it is possible to focus each character on a character that is more closely related to itself during each semantic encoding, so that the finally obtained semantic vectors for each character have a higher accuracy.

Then, the semantic vector sequence output by the last bidirectional encoding layer in the BERT model is input into the encoder of the Transformer model. The Transformer model includes a plurality of cascaded encoders, for example, including N (N≥1) cascaded encoders, such as N=6 or other numbers, which is not specifically defined by the embodiments of this application. Each encoder further includes a multi-head attention layer and a feedforward neural network layer therein, where the multi-head attention layer is configured to comprehensively extract the correlation between each character within a character sequence from a plurality of expression subspaces, and the feedforward neural network layer is configured to perform full connection on feature vectors output by the multi-head attention layer. A residual structure is provided after the multi-head attention layer and the feedforward neural network layer, that is, performing residual connection (namely, concatenation) on an input and an output of a current layer before inputting into a next layer after normalization. The input semantic vector sequence is encoded by a plurality of encoders of the Transformer model, and a textual semantic feature of the textual data is output by the last encoder.

In the above process, a textual encoding model, formed by cascading encoders of a BERT model and a Transformer model, can extract a textual semantic feature with a strong expression ability. In some embodiments, it is also possible to use only the BERT model or only the encoder of the Transformer model to extract the textual semantic feature, to reduce the computational complexity in extracting the textual semantic feature, which is not specifically defined by the embodiments of this application.

In some embodiments, the server may also acquire a textual position feature of the textual data, the textual position feature being used for characterizing a position sequence of each character in the textual data. In some embodiments, position information about each character in the character sequence is encoded to obtain a textual position feature of the textual data. Then, the textual semantic feature and the textual position feature are concatenated to obtain a textual feature of the textual data.

In some embodiments, the server may encode position information about each character using an absolute position encoding mode or a relative position encoding mode. The embodiment of this application does not specifically define encoding modes of the position information. Schematically, the use of the relative position encoding mode will be illustrated in the following step 303, which will not be repeated here.

In some embodiments, if the dimension of the textual semantic feature is different from that of the textual position feature, the textual semantic feature and the textual position feature cannot be directly concatenated. A one-dimensional convolution (Conv1D) layer can be used to perform dimension transformation (namely, dimension increase or dimension decrease) on the textual semantic feature, so that the dimension-transformed textual semantic feature is the same as the dimension of the textual position feature, thereby concatenating the dimension-transformed textual semantic feature and the textual position feature to obtain the textual feature of the textual data. The Conv1D layer refers to a convolution layer with a convolution kernel size of 1 by 1.

In some embodiments, the textual semantic feature and the textual position feature may also be fused, in addition to a concatenation mode, by means of element addition, element multiplication, bilinear fusion, and the like. The embodiments of this application do not specifically define fusion modes.

Step 303: The server extracts a picture depth feature of the picture data, and obtains the picture feature of the picture data by fusing the picture depth feature and a picture position feature.

In some embodiments, the server may extract the picture depth feature based on a picture depth model configured to extract the picture depth feature of the picture data, that is, the server inputs the picture data into the picture depth model and performs convolution processing on the picture data through the picture depth model to extract and obtain the picture depth feature. In some embodiments, the picture depth model includes, but is not limited to convolutional neural network (CNN), deep residual network (ResNet), MobileNet (a lightweight neural network), and the like. The embodiments of this application do not specifically define the model structure of the picture depth model.

Schematically, the picture depth model may be a Mobile-Net model, which refers to replacing a standard convolution layer in a visual geometry group (VGG) model with a depthwise separable convolution layer. The depthwise separable convolution is a decomposable convolution operation, which can be decomposed into depthwise convolution and pointwise convolution. The depthwise convolution differs from a standard convolution in that the standard convolution uses a convolution kernel on all channels of an input feature map, while the depthwise convolution uses different convolution kernels for each input channel, that is, one convolution kernel corresponds to one input channel, and the pointwise convolution is a Conv1D, namely, the size of the convolution kernel used is the standard convolution of 1 by 1. By using depthwise separable convolution, the amount of computation and the number of parameters of the picture depth model can be greatly reduced.

In some embodiments, the MobileNet model includes a standard convolution layer of 3 by 3, a plurality of stacked depthwise separable convolution layers, a mean pooling layer, and a full-connection layer. The standard convolution layer can be down-sampled and then input into the next layer, and similarly, the partial depthwise separable convolution layer can be down-sampled and then input into the next layer. The mean pooling layer is configured to perform mean pooling on the feature map output by the last depthwise separable convolution layer, and the full-connection layer is configured to perform full connection on the feature map output by the mean pooling layer. Schematically, the MobileNet model includes a total of 28 layers with 13 depthwise separable convolution layers.

In some embodiments, since an article generally includes a plurality of pictures, the plurality of pictures can constitute a picture sequence. The server inputs the picture sequence into a MobileNet model, where a standard convolution operation is performed on the picture sequence via a standard convolution layer to obtain a first feature map; the first feature map is input into a plurality of cascaded depthwise separable convolution layers; each depthwise separable convolution layer performs a depthwise separable convolution operation on the feature map output by the previous layer; the last depthwise separable convolution layer outputs a second feature map, and the second feature map is input into a mean pooling layer; a mean pooling operation is performed on the second feature map via the mean pooling layer to obtain a third feature map; and the third feature map is input into the full-connection layer, performing full connection on the third feature map via the full-connection layer to obtain the picture depth feature.

In some embodiments, the server may also acquire a picture position feature of the picture data, the picture position feature being used for characterizing a position sequence of each picture in the picture data. In some embodiments, position information about each picture in the picture sequence is encoded to obtain a picture position feature of the picture data. Then, the picture depth feature and the picture position feature are concatenated to obtain a picture feature of the picture data.

In some embodiments, the server may encode position information about each picture using an absolute position encoding mode or a relative position encoding mode. The embodiment of this application does not specifically define encoding modes of the position information.

Schematically, the use of the relative position encoding mode is illustrated. In this case, the textual position feature and the picture position feature are both relative position features between the textual data and the picture data, the relative position features being used for characterizing a sequence and distance between the textual data and the picture data.

In some embodiments, the acquisition methods of the relative position features include: determining position information in the article for a plurality of texts in the textual data and a plurality of pictures in the picture data; constructing a relative position encoding matrix based on the position information, any element in the relative position encoding matrix being used for characterizing relative position information between a text corresponding to a column to which the element belongs and a picture corresponding to a row to which the element belongs; and determining a relative position feature between any of the plurality of texts and any of the plurality of pictures based on the relative position encoding matrix.

FIG. 4 is a diagram showing rationality of extracting position information provided by an embodiment of this application. As shown in 400, assuming that an article includes five pieces of texts and four pictures, where the position number of a textual sequence composed of the five pieces of texts is {1, 3, 5, 7, 8}, and the position number of a picture sequence composed of the four pictures is {0, 2, 4, 6}, then the extracted absolute position relationship for the article can be represented as pos-0(img), pos-1(text), pos-2(img), pos-3(text), pos-4(img), pos-5(text), pos-6(img), pos-7(text), and pos-8(text). Schematically, based on the above absolute positional relationship, a relative position encoding matrix is constructed with a textual sequence representing a matrix column and a picture sequence representing a matrix row, which is shown in the following Table 1.

TABLE 1

|   | 1 | 3 | 5 | 7 | 8 |
|---|---|---|---|---|---|
| 0 | 1 | 3 | 5 | 7 | 8 |
| 2 | −1 | 1 | 3 | 5 | 6 |
| 4 | −3 | −1 | 1 | 3 | 4 |
| 6 | −5 | −3 | −1 | 1 | 2 |

Each element in the relative position encoding matrix is used for characterizing relative position information between a text corresponding to a column to which the element belongs and a picture corresponding to a row to which the element belongs. For example, the element "3" in the second row and the third column of the relative position encoding matrix represents the relative position information between the text "5" corresponding to the third column and the picture "2" corresponding to the second row. 3=5−2.

Upon constructing a relative position encoding matrix, relative position information between each text and each picture can be determined through the relative position encoding matrix, and a corresponding relative position feature can be obtained by encoding the relative position information.

In the above process, explicit relative position information can be introduced in both the textual feature and the picture feature using the relative position feature, thus enhancing the expression ability of each of the textual feature and the picture feature.

In some embodiments, the textual position feature and the picture position feature determined by using the traditional absolute position encoding mode both belong to an absolute position feature, which can implicitly learn the position correlation of different text passages and different article illustrations, and fully consider the modal internal position relationship between the textual sequence and the picture sequence.

In some embodiments, if the dimension of the picture depth feature is different from that of the picture position feature, the picture depth feature and the picture position feature cannot be directly concatenated. A Conv1D layer can be used to perform dimension transformation (namely, dimension increase or dimension decrease) on the picture depth feature, so that the dimension-transformed picture depth feature is the same as the dimension of the picture position feature, thereby concatenating the dimension-transformed picture depth feature and the picture position feature to obtain the picture feature of the picture data. The Conv1D layer refers to a convolution layer with a convolution kernel size of 1 by 1.

In some embodiments, the picture depth feature and the picture position feature may also be fused, in addition to a concatenation mode, by means of element addition, element multiplication, bilinear fusion, and the like. The embodiments of this application do not specifically define fusion modes.

In the above steps 302 to 303, a possible implementation is provided for the server to obtain a textual feature and a picture feature of an article in case of a two-modal fusion of a textual modality and a picture modality, where the textual feature is used for characterizing textual data in the article, and the picture feature is used for characterizing picture data in the article. In the next embodiment, it will be described how the server obtains the title feature of the title data, the textual feature of the text data, and the picture feature of the picture data in case of a three-modal fusion of a title modality, a text modality, and a picture modality, which will not be repeated here.

It is to be understood that in practical application, step 302 may be performed first and then step 303 may be performed; step 303 may be performed first and then step 302 may be performed; and step 302 and step 303 may be performed at the same time. This application does not make any limitation on the order of performing step 302 and step 303 herein.

Step 304: The server determines a first interaction feature for the textual feature based on a partial feature associated with the textual feature in the picture feature, the first interaction feature being used for characterizing the textual feature fused with the picture feature.

In some embodiments, a textual modality is used as a main modality to receive auxiliary information about a picture modality, that is, the server acquires a partial feature associated with the textual feature in the picture feature, and processes the textual feature and the partial feature using a cross-modal interaction model to obtain the first interaction feature. In some embodiments, the cross-modal interaction model includes, but is not limited to a Transformer model or a variant of the Transformer model.

FIG. 5 is a diagram showing rationality of a cross-modal interaction model provided by an embodiment of this application. As shown in 500, illustrated with the cross-modal interaction model as a cross-modal Transformer model, the cross-modal Transformer model includes D+1 (D≥0) cross-modal interaction layers. Assuming that an alpha modality is a main modality (for example, a textual modality) and a beta modality is an auxiliary modality (for example, a picture modality), the extraction process of interaction features from the beta modality to the alpha modality (beta to alpha) is as follows:

A feature $$Z_\alpha^{[0]}$$

of the alpha modality at time t=0 and a feature $$Z_\beta^{[0]}$$

of the beta modality at time t=0 are input to the $0^{th}$ layer of the cross-modal Transformer model. Since the processing of the features of the two input modalities by each layer in the cross-modal Transformer model is similar, the processing logic of an $i^{th}$ layer is illustrated, where i is any integer greater than or equal to 0 and less than or equal to D+1.

Input signals for the $i^{th}$ layer include an interaction feature $$Z_{\beta \to \alpha}^{[i-1]}$$

from the beta modality to the alpha modality at time t=i−1 and a feature $$Z_\beta^{[0]}$$

of the beta modality at time t=0. The feature $$Z_{\beta \to \alpha}^{[i-1]}$$

are input into a LayerNorm (LN) layer for normalization to obtain a feature $Q_\alpha$. Similarly, the feature $$Z_\beta^{[0]}$$

are input into another LN layer for normalization to obtain features $K_\beta$ and $V_\beta$. The above features $Q_\alpha$, $K_\beta$, and $V_\beta$ are input into a multi-head attention layer, and the input features $Q_\alpha$, $K_\beta$, and $V_\beta$ are weighted based on an attention mechanism via the multi-head attention layer to extract a cross-modal feature $$CM_{\beta \to \alpha}(Z_{\beta \to \alpha}^{[i-1]}, Z_\beta^{[0]})$$

between the input signals; and the cross-modal feature $$CM_{\beta \to \alpha}(Z_{\beta \to \alpha}^{[i-1]}, Z_\beta^{[0]})$$

and the feature $Q_\alpha$ in the input signals are added by elements to obtain a fused feature. The fused feature is input into another LN layer for normalization, and the normalized fused feature is input into a full-connection positionwise feedforward network layer to perform full connection; the features output by the full-connection positionwise feedforward network layer and the fused feature input to the full-connection positionwise feedforward network layer are added by elements to obtain an output feature of the $i^{th}$ layer, namely, an interaction feature $$Z_{\beta \to \alpha}^{[i]}$$

from the beta modality to the alpha modality at time t=i, and so on; finally, a final interaction feature $$Z_{\beta \to \alpha}^{[D]}$$

(namely, a first interaction feature) is output from a $D^{th}$ layer. Two addition operations by elements are equivalent to performing residual connection on respective inputs and outputs of the multi-head attention layer and the full-connection positionwise feedforward network layer.

In the above process, the cross-modal Transformer model receives a sequence feature of the main modality and the auxiliary modality as an input signal, and finally outputs a main modality representation (namely, a first interaction feature) fusing the information about the auxiliary modality after two-stage processing of the multi-head attention layer and the full-connection positionwise feedforward network layer. The multi-head attention layer can be regarded as a modification to a self-attention layer, changing K and V of the input feature to feature sequences $K_\beta$ and $V_\beta$ of the auxiliary modality beta, while the feature Q is a feature sequence $Q_\alpha$ of the main modality alpha. The main modality is used to select the information of the auxiliary modality owing interaction with itself in the auxiliary modality, so that the extracted first interaction feature has stronger feature expression ability. Further, the structure of the cross-modal Transformer model has versatility and flexibility, and can be customized and combined according to the importance of a modal in designing the model. The attention mechanism of the cross-modal in the multi-head attention layer is directional, namely, for the same pair of input modalities {text, picture}, the interaction features extracted by the text-based modality and the picture-based modality are different, such as the first interaction feature, extracted in response to the text-based modal being used in the present step 304, and a second interaction feature, extracted in response to the picture-based modal being used in the following step 305. The first interaction feature is different from the second interaction feature, which helps the model to make full use of the interaction information between modalities. Furthermore, the cross-modal Transformer model can fuse more high-order interaction information than the traditional single-layer interaction scheme by using the stack of a plurality of cross-modal interaction layers.

In the above process, the first interaction feature is directly output by the cross-modal Transformer model, which can reduce the computational complexity when acquiring the first interaction feature. In some embodiments, the feature output by the cross-modal Transformer model can also be used as an intermediate interaction feature, and then the intermediate interaction feature is input into a basic Transformer model for encoding and then decoding, and finally the first interaction feature is output by the basic Transformer model.

In some embodiments, the server inputs the intermediate interaction feature into a Transformer model including N cascaded encoders and N cascaded decoders. The N cascaded encoders are called to encode the intermediate interaction feature, and the feature obtained by encoding is input into the N cascaded decoders for decoding to obtain the first interaction feature. N is an integer greater than or equal to 1, for example, N=6 or other values.

In some embodiments, each encoder in the N cascaded encoders includes a multi-head attention layer and a feedforward neural network layer therein, where the multi-head attention layer is configured to comprehensively extract the correlation between feature vectors at various moments from a plurality of expression subspaces, and the feedforward neural network layer is configured to perform full connection on feature vectors output by the multi-head attention layer. A residual structure is provided after the multi-head attention layer and the feedforward neural network layer, that is, performing residual connection (namely, concatenation) on an input and an output of a current layer before inputting into a next layer after normalization. The input vectors are encoded by the N cascaded encoders, and the feature output by the last encoder is input to the N cascaded decoders.

Each decoder of the N cascaded decoders includes a masked multi-head attention layer, a fused multi-head attention layer, and a feedforward neural network layer therein. The masked multi-head attention layer is similar to the multi-head attention layer, but the masked multi-head attention layer only focuses on the translation result before the current moment, and therefore needing to perform mask processing on the translation result after the current moment. The fused multi-head attention layer is also similar to the multi-head attention layer, but the fused multi-head attention layer uses the output of the feedforward neural network layer of the encoder corresponding to the serial number (referring to the result after residual connection and normalization) as an input, in addition to the output of the masked multi-head attention layer of the present decoder. Such design is to pay attention to the encoding information about the encoder, in other words, the decoder predicts the interaction features at the next moment by looking at the output of the encoder and the self-attention to the output thereof. The feedforward neural network layer of the decoder is similar to the feedforward neural network layer of the encoder, which will not be repeated here. Similarly, a residual structure is provided after the masked multi-head attention layer, the fused multi-head attention layer, and the feedforward neural network layer of the decoder, that is, the input and output of the current layer are residual connected (namely, concatenated) and normalized before being input into the next layer. The number of cascaded encoders is kept consistent with the number of cascaded decoders. The encoded features can be decoded by the N cascaded decoders, and the last decoder outputs the first interaction feature.

Step 305: The server determines a second interaction feature for the picture feature based on a partial feature associated with the picture feature in the textual feature, the second interaction feature being used for characterizing the picture feature fused with the textual feature.

In some embodiments, a picture modality is used as a main modality to receive auxiliary information about a textual modality, that is, the server acquires a partial feature associated with the picture feature in the textual feature, and processes the picture feature and the partial feature using a cross-modal interaction model to obtain the second interaction feature. In some embodiments, the cross-modal interaction model includes, but is not limited to a Transformer model or a variant of the Transformer model.

The above step 305 is similar to the above step 304, except that the main modality alpha is changed to the picture modality and the auxiliary modality beta is changed to the textual modality, which will not be described in detail.

In the above process, the second interaction feature is directly output by the cross-modal Transformer model, which can reduce the computational complexity when acquiring the second interaction feature. In some embodiments, the feature output by the cross-modal Transformer model is used as an intermediate interaction feature, and the intermediate interaction feature is input into a basic Transformer model for encoding and then decoding, and finally the second interaction feature is output by the basic Transformer model. In some embodiments, the server inputs the intermediate interaction feature into a Transformer model including N cascaded encoders and N cascaded decoders. The N cascaded encoders are called to encode the intermediate interaction feature, and the feature obtained by encoding is input into the N cascaded decoders for decoding to obtain the first interaction feature. N is an integer greater than or equal to 1, for example, N=6 or other values. The internal processing logic for each encoder and decoder in the basic Transformer model has been introduced in the above step 304, which will not be repeated here.

It is to be understood that in practical application, step 304 may be performed first and then step 305 may be performed; step 305 may be performed first and then step 304 may be performed; and step 304 and step 305 may be performed at the same time. This application does not make any limitation on the order of performing step 304 and step 305 herein.

Step 306: The server obtains a cross-modal interaction feature by fusing the first interaction feature and the second interaction feature.

In some embodiments, the server may concatenate the first interaction feature and the second interaction feature to obtain a final cross-modal interaction feature, thereby reducing the amount of computation in feature fusion.

In other embodiments, the server may add, multiply or bilinearly converge the first interaction feature and the second interaction feature by elements to make feature fusion more sufficient. The embodiments of this application do not specifically define feature fusion modes.

In the above steps 304 to 306, a possible implementation of the server acquiring cross-modal interaction features between two modalities in the case of two-modal fusion of textual modality and picture modality is shown. In the next embodiment, how the server acquires cross-modal interaction features between three modalities will be described for the case of three-modal fusion of a title modality, a text modality, and a picture modality, which will not be described in detail herein.

Step 307: The server determines an article classification to which the article belongs based on the cross-modal interaction feature.

The above step 307 is similar to the above step 205, which will not be repeated here.

Figure 6:
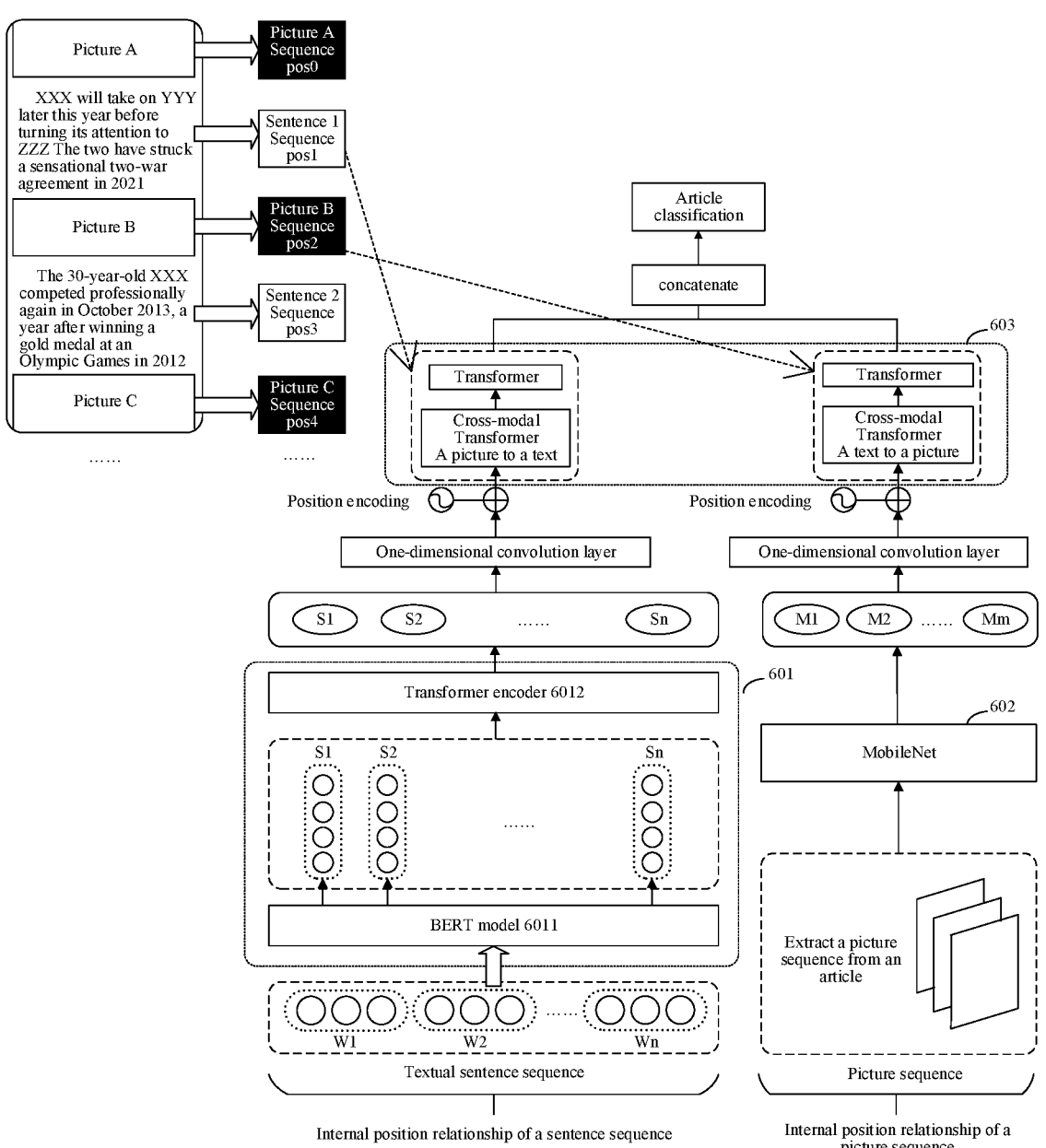
FIG. 6 is a diagram showing rationality of a multi-modal fusion network incorporating relative position encoding provided by an embodiment of this application.

FIG. 6 is a diagram showing rationality of a multi-modal fusion network incorporating relative position encoding provided by an embodiment of this application. As shown in FIG. 6, the multi-modal fusion network includes a textual encoding model 601, a picture encoding model 602, and a cross-modal interaction portion 603.

Schematically, the textual encoding model 601 can be formed by cascading a BERT model 6011 obtained by finetuning a basic BERT model and an encoder 6012 of a Transformer model. A character sequence of textual data (referred to as a textual sentence sequence for short) is input into the BERT model 6011; a semantic vector sequence is output, and the semantic vector sequence is input into the encoder 6012 of the Transformer model; textual semantic features of the textual data are output, and the textual semantic features are input into a Conv1D layer for dimensional transformation before being concatenated with textual position features, to obtain a textual feature of the textual data.

Schematically, the picture encoding model 602 is a MobileNet model obtained by pre-training. A picture sequence of picture data is input into the picture encoding model 602; a picture depth feature of the picture data is output; the picture depth feature is input into the Conv1D layer for dimensional transformation before being concatenated with a picture position feature, to obtain a picture feature of the picture data.

Schematically, the cross-modal interaction portion 603 includes two cross-modal Transformer models and two basic Transformer models. Taking the textual modality as the main modality, the cross-modal Transformer model is used to extract intermediate interaction features from the picture modality to the textual modality; and the intermediate interaction features are input into the basic Transformer model for encoding and then decoding, to output the first interaction feature. Taking the picture modality as the main modality, the cross-modal Transformer model is used to extract intermediate interaction features from the textual modality to the picture modality; and the intermediate interaction features are input into the basic Transformer model for encoding and then decoding, to output the second interaction feature.

Further, the first interaction feature and the second interaction feature are concatenated to obtain a final cross-modal interaction feature between the two modalities. The final cross-modal interaction feature is used to predict and obtain a final article classification to which the article belongs.

In some embodiments, if the relative position encoding mode introduced in the above step 303 is used, the absolute position feature of each Transformer model in the cross-modal interaction portion 603 needs to be modified into a relative position feature, for example, separating original character embedding vectors and position vectors, and converting the position vector of the absolute position encoding mode into the position vector of the relative position encoding mode after expanding the determinant, that is, fusing the relative position relationship into the self-attention layer when any two modalities perform interaction calculation.

In the Transformer model, the self-attention layer is usually represented as:

$$\text{Attention}\ (Q,\ K,\ V) = \text{softmax}\left(\frac{QK^T}{\sqrt{d_k}}\right)V$$

Where Attention (Q, K, V) refers to an attention coefficient calculated based on a Query (Q) matrix, a Key (K) matrix, and a Value (V) matrix; softmax ( ) refers to an exponential normalization function; Q refers to a Q matrix of a current character; K refers to a K matrix of the current character; V refers to a V matrix of the current character; $K^T$ refers to a transpose matrix of the K matrix; and $1/\sqrt{d_k}$ refers to a scaling factor.

Using the multiplicative distributive law expansion, the expansion formula of an attention coefficient $$A_{i,j}^{abs}$$

between an $i^{th}$ element in modality 1 and a $j^{th}$ element in modality 2 in the case of the absolute position encoding mode is as follows:

$$A_{i,j}^{abs} = \underbrace{E_{x_i}^T W_q^T W_k E_{x_j}}_{(a)} + \underbrace{E_{x_i}^T W_q^T W_k U_j}_{(b)} + \underbrace{U_i^T W_q^T W_k E_{x_j}}_{(c)} + \underbrace{U_i^T W_q^T W_k U_j}_{(d)}$$

Where E represents a textual vector, U refers to a position vector, and W refers to a parameter matrix.
That is, $$E_{x_i}^T$$

represents a transpose matrix of a textual vector of the $i^{th}$ element in modality 1;

$$W_q^T$$

represents a transpose matrix of a parameter matrix of a Q matrix; $W_k$ represents a parameter matrix of a K matrix; $E_{x_j}$ represents a textual vector of the $j^{th}$ element in modality 2; $U_j$ represents a position vector of the $j^{th}$ element in modality 2; and $$U_i^T$$

represents a transpose matrix of a position vector of the $i^{th}$ element in modality 1.

The position vector $R_{i-j}$ of the relative position encoding mode is used to replace the position vectors $U_j$ and $U_i$ of the absolute position encoding mode. The above expansion formula can be transformed into:

$$A_{i,j}^{rel} = \underbrace{E_{x_i}^T W_q^T W_{k,E} E_{x_j}}_{(a)} + \underbrace{E_{x_i}^T W_q^T W_{k,R} R_{i-j}}_{(b)} + \underbrace{u^T W_{k,E} E_{x_j}}_{(c)} + \underbrace{v^T W_{k,R} R_{i-j}}_{(d)}$$

Where E represents a textual vector, U refers to a position vector, and W refers to a parameter matrix.
That is, $$E_{x_i}^T$$

represents a transpose matrix of a textual vector of the $i^{th}$ element in the modality 1;

$$W_q^T$$

represents a transpose matrix of a parameter matrix of a Q matrix; $W_{k,E}$ represents a parameter matrix related to the K matrix and the textual vector under relative position encoding; $E_{x_j}$ represents a textual vector of the $j^{th}$ element in the modality 2; $R_{i-j}$ 1 represents a relative position encoding vector between the $i^{th}$ element in the modality 1 and the $j^{th}$ element in the modality 2; $W_{k,R}$ represents a parameter matrix related to the K matrix and the relative position encoding vector under the relative position encoding; and $u^T$, $v^T$ represent to-be-learned parameter vectors independent of the position of the $i^{th}$ element in the modality 1.

All the above alternative technical solutions can be combined in any manner to form alternative embodiments of the present disclosure, which will not be repeated here.

The method provided by the embodiments of this application, for textual data and picture data of an article, extracts a textual feature and a picture feature, respectively, and predicts an article classification to which the article belongs using a cross-modal interaction feature between the textual feature and picture feature. At the same time, the method considers the contribution degree of each of the textual modality and the picture modality to the article classification, rather than determining from a textual perspective only. In addition, the extracted cross-modal interaction feature is not a simple concatenation of the textual feature and the picture feature, which can reflect richer and deeper intermodal interaction information, and help to improve the identification accuracy of the article classification. Furthermore, it can improve the discovering accuracy of high-quality articles in the scene of identifying high-quality articles.

FIG. 7 is a flowchart of a data processing method provided by an embodiment of this application. With reference to FIG. 7, the embodiment is performed by a computer device, illustrated with the computer device as a server. For the case where an article is divided into three modalities, namely, a title modality, a text modality, and a picture modality, the embodiment of this application will describe in detail how to identify an article classification of an article based on a three-modal fusion mode, including the following steps:

Step 701: The server obtains title data, text data, and picture data in the article.

Here, the title data and the text data may be collectively referred to as textual data.

The above step 701 is similar to the above step 301, which will not be repeated here. In some embodiments, after acquiring the textual data and the picture data, the server may further extract title data and text data from the textual data.

Step 702: The server extracts a title semantic feature of the title data, and obtains the title feature of the title data by fusing the title semantic feature and a title position feature.

In some embodiments, the server extracts the title semantic feature based on a title encoding model configured to extract the title semantic feature of the title data, that is, the server inputs the title data into the title encoding model and encodes the title data through the title encoding model to extract and obtain the title semantic feature. In some embodiments, the model structure of the title encoding model includes, but is not limited to a BERT model, a Transformer model, an ELMO model, a NNLM model, and the like. The embodiments of this application do not specifically define the model structure of the title encoding model.

Schematically, illustrated with the title encoding model as a BERT model, assuming that the title data includes at least one title, the server can perform word segmentation on each title to obtain at least one character contained in each title, and arrange each character of each title according to the sequence appearing in the article thereof to form a character sequence, and add [SEP] as a sentence divider at the end of each title in the character sequence, and add [CLS] as a classifier at the top of the character sequence. The sentence divider is used for breaking between adjacent titles, and the classifier is used for characterizing the global semantic information of the whole character sequence.

The character sequence is input into a BERT model including an embedding layer and at least one bidirectional encoding layer. Each bidirectional encoding layer is configured to perform forward encoding and reverse encoding on an input signal, and the output of each bidirectional encoding layer serves as the input of the next bidirectional encoding layer, that is, each bidirectional encoding layers is connected in series. Each bidirectional encoding layer includes two parts, one part being an attention network, and the other part being a forward full-connection layer. Each hidden layer in the attention network is obtained by performing a weighted average on the hidden layers of the previous layer, so that each hidden layer can be directly associated with all the hidden layers of the previous layer. A hidden layer vector for characterizing global information can be obtained using the input long sequence information (namely, the character sequence). The forward full-connection layer is configured to further process the global information acquired by the attention network to enhance the learning capability of the whole BERT model.

In some embodiments, the character sequence can be firstly input into an embedding layer of the BERT model, and each character in the character sequence is embedded by the embedding layer, in other words, mapping each character to an embedding space to obtain an embedding vector of each character, namely, to obtain an embedding vector sequence. Then, the embedding vector sequence is input into the at least one bidirectional encoding layer, through which each embedding vector in the embedding vector sequence is bidirectional encoded (including forward encoding and reverse encoding), and a semantic vector of each character is output, that is, a semantic vector sequence is obtained. Finally, the title semantic feature of the title data is output via the last bidirectional encoding layer. Each character in the character sequence corresponds to an embedding vector in the embedding vector sequence, and each embedding vector in the embedding vector sequence corresponds to a semantic vector in the semantic vector sequence.

In the above process, forward encoding and reverse encoding are performed on the embedding vector sequence through a bidirectional encoding layer. Forward encoding enables the semantic vector corresponding to each character to fuse relevant information about characters appearing before the character, while reverse encoding enables the semantic vector corresponding to each character to fuse relevant information about characters appearing after the character. Two-way encoding operations can greatly improve the expression ability of the semantic vector of each character.

Illustrated is a first bidirectional encoding layer in which an attention network and a forward full-connection layer are included. The embedding vector sequence is input into an attention network of a first bidirectional encoding layer, and weighted through the attention network to extract an attention feature sequence of the embedding vector sequence. The attention feature sequence is input into a forward full-connection layer of the first bidirectional encoding layer, and performed bidirectional semantic encoding (including forward encoding and reverse encoding) through the forward full-connection layer to output an implicit vector sequence, inputting the implicit vector sequence into a second bidirectional encoding layer, and so on. The processing logic of subsequent bidirectional encoding layers is similar to the first bidirectional encoding layer, which will not be repeated here. Finally, the title semantic feature of the title data is output by the last bidirectional encoding layer. Due to the introduction of the attention mechanism in the bidirectional encoding layer, it is possible to focus each character on a character that is more closely related to itself during each semantic encoding, so that the finally obtained semantic vectors for each character have a higher accuracy.

In some embodiments, the server may also acquire a title position feature of the title data, the title position feature being used for characterizing a position sequence of each character in the title data. In some embodiments, position information about each character in the character sequence is encoded to obtain a title position feature of the title data. Then, the title semantic feature and the title position feature are concatenated to obtain the title feature of the title data.

In some embodiments, the server may encode position information about each character using an absolute position encoding mode or a relative position encoding mode. The embodiment of this application does not specifically define encoding modes of the position information. Both position encoding modes have been described in the previous embodiment, which will not be repeated here.

In some embodiments, if the dimension of the title semantic feature is different from that of the title position feature, the title semantic feature and the title position feature cannot be directly concatenated. A one-dimensional convolution (Conv1D) layer can be used to perform dimension transformation (namely, dimension increase or dimension decrease) on the title semantic feature, so that the dimension-transformed title semantic feature is the same as the dimension of the title position feature, thereby concatenating the dimension-transformed title semantic feature and the title position feature to obtain the title feature of the title data. The Conv1D layer refers to a convolution layer with a convolution kernel size of 1 by 1.

In some embodiments, the title semantic feature and the title position feature may also be fused, in addition to a concatenation mode, by means of element addition, element multiplication, bilinear fusion, and the like. The embodiments of this application do not specifically define fusion modes.

Step 703: The server extracts a text semantic feature of the text data, and obtains the textual feature of the text data by fusing the text semantic feature and a text position feature.

In some embodiments, the server extracts the text semantic feature based on a text encoding model configured to extract the text semantic feature of the text data, that is, the server inputs the text data into the text encoding model and encodes the text data through the text encoding model to extract and obtain the text semantic feature. In some embodiments, a model structure of the text encoding model includes, but is not limited to, any one or a combination of at least two of the following: a BERT model, a Transformer model, an ELMO model, a NNLM model, and the like. The embodiments of this application do not specifically define the model structure of the text encoding model. Schematically, the text encoding model may be formed by cascading the encoders of the BERT model and the Transformer model. The processing of text data by such structured text encoding model is similar to the processing of textual data by the textual encoding model in the above step 302, which will not be repeated here.

In some embodiments, the server may also acquire a text position feature of the text data, the text position feature being used for characterizing a position sequence of each character in the text data. In some embodiments, position information about each character in the character sequence is encoded to obtain a text position feature of the text data. Then, the text semantic feature and the text position feature are concatenated to obtain the textual feature of the text data.

In some embodiments, the server may encode position information about each character using an absolute position encoding mode or a relative position encoding mode. The embodiment of this application does not specifically define encoding modes of the position information. Both position encoding modes have been described in the previous embodiment, which will not be repeated here.

In some embodiments, if the dimension of the text semantic feature is different from that of the text position feature, the text semantic feature and the text position feature cannot be directly concatenated. A one-dimensional convolution (Conv1D) layer can be used to perform dimension transformation (namely, dimension increase or dimension decrease) on the text semantic feature, so that the dimension-transformed text semantic feature is the same as the dimension of the text position feature, thereby concatenating the dimension-transformed text semantic feature and the text position feature to obtain the textual feature of the text data. The Conv1D layer refers to a convolution layer with a convolution kernel size of 1 by 1.

In some embodiments, the text semantic feature and the text position feature may also be fused, in addition to a concatenation mode, by means of element addition, element multiplication, bilinear fusion, and the like. The embodiments of this application do not specifically define fusion modes.

In the above steps 702 to 703, a possible embodiment is provided that in the case of dividing the textual data into title data and text data, the server extracts the textual semantic feature of the textual data, and fuses the textual semantic feature and the textual position feature to obtain the textual feature of the textual data. By dividing the textual data into title data and text data, more and richer feature information can be extracted.

Step 704: The server extracts a picture depth feature of the picture data, and obtains the picture feature of the picture data by fusing the picture depth feature and a picture position feature.

The above step 704 is similar to the above step 303, which will not be repeated here.

It is to be understood that in practical application, the performing order between the above steps 702, 703, and 704 can be adjusted according to practical requirements. This application does not make any limitation on the order of performing steps 702, 703, and 704.

Step 705: The server determines the title interaction feature for the title feature based on partial features associated with the title feature in the textual feature and the picture feature, the title interaction feature being used for characterizing the title feature fused with the textual feature and the picture feature.

In some embodiments, the server determines a first title interaction feature based on a partial feature associated with the title feature in the textual feature, that is, receives auxiliary information of the text modality with the title modality as the main modality. In some embodiments, the server acquires a partial feature associated with the title feature in the textual feature, and processes the title feature and the partial feature using a cross-modal interaction model to obtain the first title interaction feature. In some embodiments, the cross-modal interaction model includes, but is not limited to a Transformer model or a variant of the Transformer model. For example, the cross-modal interaction model can be a cross-modal Transformer model, where the main modality alpha is determined as a title modality, and the auxiliary modality beta is determined as a text modality. The model structure and processing logic are similar to the above step 304, which will not be repeated here.

In some embodiments, the server determines a first title interaction feature based on a partial feature associated with the title feature in the picture feature, that is, receives auxiliary information of the picture modality with the title modality as the main modality. In some embodiments, the server acquires a partial feature associated with the title feature in the picture feature, and processes the title feature and the partial feature using a cross-modal interaction model to obtain the second title interaction feature. In some embodiments, the cross-modal interaction model includes, but is not limited to a Transformer model or a variant of the Transformer model. For example, the cross-modal interaction model can be a cross-modal Transformer model, where the main modality alpha is determined as a title modality, and the auxiliary modality beta is determined as a picture modality. The model structure and processing logic are similar to the above step 304, which will not be repeated here.

In some embodiments, the server concatenates the first title interaction feature and the second title interaction feature to obtain a third title interaction feature, which can reduce the computational complexity when fusing the first title interaction feature and the second title interaction feature. In some embodiments, fusion modes such as element addition, element multiplication, and bilinear fusion can also be adopted, which is not specifically defined by the embodiments of this application.

In some embodiments, the server encodes and decodes the third title interaction feature to obtain the title interaction feature. In some embodiments, the server inputs the third title interaction feature into a Transformer model including N cascaded encoders and N cascaded decoders. The N cascaded encoders are called to encode the third title interaction feature to obtain an intermediate title interaction feature. The intermediate title interaction feature is input into the N cascaded decoders for decoding to obtain the title interaction feature. N is an integer greater than or equal to 1, for example, N=6 or other values.

In some embodiments, each encoder in the N cascaded encoders includes a multi-head attention layer and a feedforward neural network layer therein, where the multi-head attention layer is configured to comprehensively extract the correlation between each character in the title data from a plurality of expression subspaces, and the feedforward neural network layer is configured to perform full connection on feature vectors output by the multi-head attention layer. A residual structure is provided after the multi-head attention layer and the feedforward neural network layer, that is, performing residual connection (namely, concatenation) on an input and an output of a current layer before inputting into a next layer after normalization. The input vectors are encoded by the N cascaded encoders, and the intermediate title interaction feature is output by the last encoder.

Next, the intermediate title interaction feature is input to the N cascaded decoders. Each decoder of the N cascaded decoders includes a masked multi-head attention layer, a fused multi-head attention layer, and a feedforward neural network layer therein. The masked multi-head attention layer is similar to the multi-head attention layer, but the masked multi-head attention layer only focuses on the translation result before the current moment, and therefore needing to perform mask processing on the translation result after the current moment. The fused multi-head attention layer is also similar to the multi-head attention layer, but the fused multi-head attention layer uses the output of the feedforward neural network layer of the encoder corresponding to the serial number (referring to the result after residual connection and normalization) as an input, in addition to the output of the masked multi-head attention layer of the present decoder. Such design is to pay attention to the encoding information about the encoder, in other words, the decoder predicts the interaction features at the next moment by looking at the output of the encoder and the self-attention to the output thereof. The feedforward neural network layer of the decoder is similar to the feedforward neural network layer of the encoder, which will not be repeated here. Similarly, a residual structure is provided after the masked multi-head attention layer, the fused multi-head attention layer, and the feedforward neural network layer of the decoder, that is, the input and output of the current layer are residual connected (namely, concatenated) and normalized before being input into the next layer. The number of cascaded encoders is kept consistent with the number of cascaded decoders. The intermediate title interaction feature can be decoded by N cascaded decoders, and the final title interaction feature is output by the last decoder.

Step 706: The server determines a text interaction feature for the textual feature based on partial features associated with the textual feature in the title feature and the picture feature, the text interaction feature being used for characterizing the textual feature fused with the title feature and the picture feature.

Since the first interaction feature includes a title interaction feature and a text interaction feature in the case of three-modal fusion of title modality, text modality, and picture modality, steps 705 to 706 show possible implementations of how to acquire the first interaction feature.

In some embodiments, the server determines a first text interaction feature based on a partial feature associated with the textual feature in the title feature, that is, receives auxiliary information of the title modality with the text modality as the main modality. In some embodiments, the server acquires a partial feature associated with the textual feature in the title feature, and processes the textual feature and the partial feature using a cross-modal interaction model to obtain the first text interaction feature. In some embodiments, the cross-modal interaction model includes, but is not limited to a Transformer model or a variant of the Transformer model. For example, the cross-modal interaction model can be a cross-modal Transformer model, where the main modality alpha is determined as a text modality, and the auxiliary modality beta is determined as a title modality. The model structure and processing logic are similar to the above step 304, which will not be repeated here.

In some embodiments, the server determines a second text interaction feature based on a partial feature associated with the textual feature in the picture feature, that is, receives auxiliary information of the picture modality with the text modality as the main modality. In some embodiments, the server acquires a partial feature associated with the textual feature in the picture feature, and processes the textual feature and the partial feature using a cross-modal interaction model to obtain the second text interaction feature. In some embodiments, the cross-modal interaction model includes, but is not limited to a Transformer model or a variant of the Transformer model. For example, the cross-modal interaction model can be a cross-modal Transformer model, where the main modality alpha is determined as a text modality, and the auxiliary modality beta is determined as a picture modality. The model structure and processing logic are similar to the above step 304, which will not be repeated here.

In some embodiments, the server concatenates the first text interaction feature and the second text interaction feature to obtain a third text interaction feature, which can reduce the computational complexity when fusing the first text interaction feature and the second text interaction feature. In some embodiments, fusion modes such as element addition, element multiplication, and bilinear fusion can also be adopted, which is not specifically defined by the embodiments of this application.

In some embodiments, the server encodes and decodes the third text interaction feature to obtain the text interaction feature. In some embodiments, the server inputs the third text interaction feature into a Transformer model, encodes the third text interaction feature through N cascaded encoders in the Transformer model to obtain an intermediate text interaction feature, and inputs the intermediate text interaction feature into N cascaded decoders for decoding to obtain the text interaction feature. N is an integer greater than or equal to 1, for example, N=6 or other values. The internal processing logic of the encoder and decoder of the Transformer model has been described in detail in the above step 705, which will not be repeated here.

Step 707: The server determines a second interaction feature for the picture feature based on partial features associated with the picture feature in the title feature and the textual feature, the second interaction feature being used for characterizing the picture feature fused with the title feature and the textual feature.

In some embodiments, the server determines a first picture interaction feature based on a partial feature associated with the picture feature in the title feature, that is, receives auxiliary information of the title modality with the picture modality as the main modality. In some embodiments, the server acquires a partial feature associated with the picture feature in the title feature, and processes the picture feature and the partial feature using a cross-modal interaction model to obtain the first picture interaction feature. In some embodiments, the cross-modal interaction model includes, but is not limited to a Transformer model or a variant of the Transformer model. For example, the cross-modal interaction model can be a cross-modal Transformer model, where the main modality alpha is determined as a picture modality, and the auxiliary modality beta is determined as a title modality. The model structure and processing logic are similar to the above step 304, which will not be repeated here.

In some embodiments, the server determines a second picture interaction feature based on a partial feature associated with the picture feature in the textual feature, that is, receives auxiliary information of the text modality with the picture modality as the main modality. In some embodiments, the server acquires a partial feature associated with the picture feature in the textual feature, and processes the picture feature and the partial feature using a cross-modal interaction model to obtain the second picture interaction feature. In some embodiments, the cross-modal interaction model includes, but is not limited to a Transformer model or a variant of the Transformer model. For example, the cross-modal interaction model can be a cross-modal Transformer model, where the main modality alpha is determined as a picture modality, and the auxiliary modality beta is determined as a text modality. The model structure and processing logic are similar to the above step 304, which will not be repeated here.

In some embodiments, the server concatenates the first picture interaction feature and the second picture interaction feature to obtain a third picture interaction feature, which can reduce the computational complexity when fusing the first picture interaction feature and the second picture interaction feature. In some embodiments, fusion modes such as element addition, element multiplication, and bilinear fusion can also be adopted, which is not specifically defined by the embodiments of this application.

In some embodiments, the server encodes and decodes the third picture interaction feature to obtain the second interaction feature. In some embodiments, the server inputs the third picture interaction feature into a Transformer model, encodes the third picture interaction feature through N cascaded encoders in the Transformer model to obtain an intermediate picture interaction feature, and inputs the intermediate picture interaction feature into N cascaded decoders for decoding to obtain the second interaction feature. N is an integer greater than or equal to 1, for example, N=6 or other values. The internal processing logic of the encoder and decoder of the Transformer model has been described in detail in the above step 705, which will not be repeated here.

It is to be understood that in practical application, the performing order between the above steps 705, 706, and 707 can be adjusted according to practical requirements. This application does not make any limitation on the order of performing steps 705, 706, and 707.

Step 708: The server fuses the title interaction feature, the text interaction feature, and the second interaction feature to obtain a cross-modal interaction feature.

In some embodiments, the server concatenates the title interaction feature, the text interaction feature, and the second interaction feature to obtain a final cross-modal interaction feature between the three modalities, thereby reducing the amount of computation in feature fusion.

In other embodiments, the server can fuse the title interaction feature, the text interaction feature, and the second interaction feature by means of element addition, element multiplication or bilinear fusion, and the like, so that the feature can be fused more fully. The embodiments of this application do not specifically define the feature fusion mode.

In the above steps 705 to 708, a possible embodiment of the server acquiring cross-modal interaction features is provided, namely, by dividing the textual data into title data and text data, thereby expanding the original two-modal fusion into three-modal fusion, which can make full use of the sequence-level interaction information between the modalities to perform directional cross-modal attention weighting on a pair-wise combination (a total of six combination modes) of the three modalities of the title modality, the text modality, and the picture modality. Each modality will receive auxiliary information about the other two modalities as a main modality, thus greatly improving the expression ability of the finally acquired cross-modal interaction features, as well as the prediction accuracy based on cross-modal interaction features.

Step 709: The server determines an article classification to which the article belongs based on the cross-modal interaction feature.

The above step 709 is similar to the above step 205, which will not be repeated here.

Figure 8:
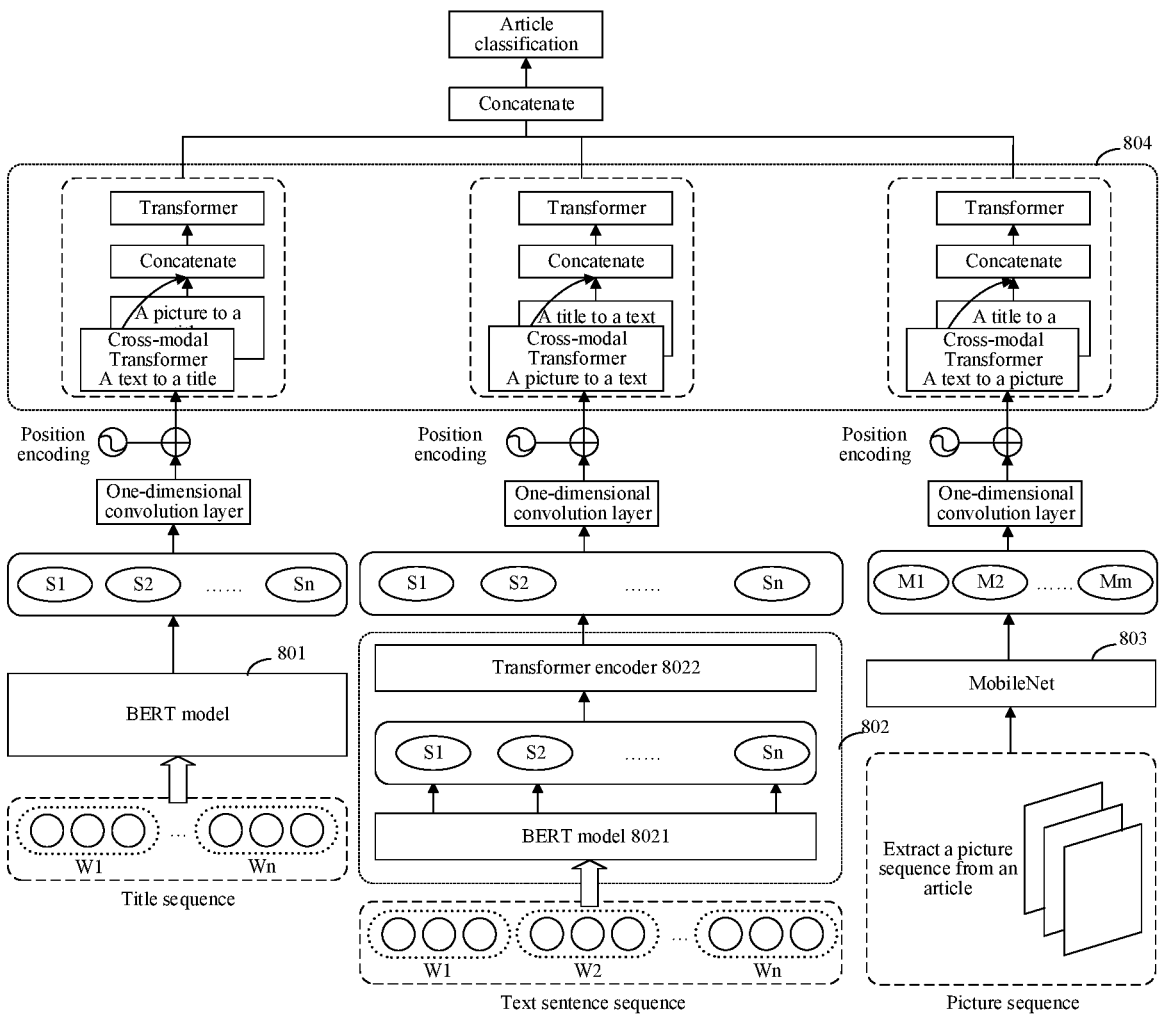
FIG. 8 is a diagram showing rationality of a multi-modal fusion network provided by an embodiment of this application.

FIG. 8 is a diagram showing rationality of a multi-modal fusion network provided by an embodiment of this application. As shown in FIG. 8, the multi-modal fusion network includes a title encoding model 801, a text encoding model 802, a picture encoding model 803, and a cross-modal interaction portion 804.

Schematically, the title encoding model 801 is a BERT model obtained by finetuning a basic BERT model. A character sequence of title data (referred to as a title sequence for short) is input into the title encoding model 801; title semantic features of the title data are output; the title semantic features are input into a Conv1D layer for dimensional transformation before being concatenated with title position features, to obtain a title feature of the title data.

Schematically, the text encoding model 802 is formed by cascading a BERT model 8021 obtained by finetuning and an encoder 8022 of the Transformer model. A character sequence of text data (referred to as a text sentence sequence for short) is input into the BERT model 8021; a semantic vector sequence is output, and the semantic vector sequence is input into the encoder 8022 of the Transformer model; text semantic features of the text data are output, and the text semantic features are input into the Conv1D layer for dimensional transformation before being concatenated with text position features, to obtain a textual feature of the text data.

Schematically, the picture encoding model 803 is a MobileNet model obtained by pre-training. A picture sequence of picture data is input into the picture encoding model 803; a picture depth feature of the picture data is output; the picture depth feature is input into the Conv1D layer for dimensional transformation before being concatenated with a picture position feature, to obtain a picture feature of the picture data.

Schematically, the cross-modal interaction portion 804 includes six cross-modal Transformer models and three basic Transformer models. Taking the title modality as the main modality, the cross-modal Transformer model is used to extract a first title interaction feature from a text modality to a title modality and a second title interaction feature from a picture modality to the title modality; the first title interaction feature and the second title interaction feature are concatenated to obtain a third title interaction feature; the third title interaction feature is input into the Transformer model foe encoding and then decoding, to output the title interaction feature. In addition, taking the text modality as the main modality, the cross-modal Transformer model is used to extract a first text interaction feature from a title modality to a text modality and a second text interaction feature from a picture modality to the text modality; the first text interaction feature and the second text interaction feature are concatenated to obtain a third text interaction feature; the third text interaction feature is input into the Transformer model for encoding and then decoding, to output the text interaction feature. In addition, taking the picture modality as the main modality, the cross-modal Transformer model is used to extract a first picture interaction feature from a title modality to a picture modality and a second picture interaction feature from a text modality to the picture modality; the first picture interaction feature and the second picture interaction feature are concatenated to obtain a third picture interaction feature; the third picture interaction feature is input into the Transformer model for encoding and then decoding, to output the second interaction feature.

Further, the title interaction feature, the text interaction feature, and the second interaction feature are concatenated to obtain a final cross-modal interaction feature between the three modalities. The final cross-modal interaction feature is used to predict a final article classification to which the article belongs. It should be noted that in the case of three-modal fusion, relative position encoding mode can also be introduced in a similar manner as in the above embodiments, which will not be repeated here.

The traditional multi-modal fusion mode, due to different sampling rates of each modality, cannot improve such two problems as the data of each modality being essentially non-aligned, and a long dependence between the elements of different modalities. Therefore, its identification accuracy of the article classification is low. However, the above multi-modal fusion network constructs a cross-modal interaction method under the non-aligned condition of picture-textual quality identification, is able to make full use of the sequence-level interaction information between the modalities aiming at the cross-modal interaction portion of the three modalities, continues to model a self-attention-based Transformer model combined with the context after the fusion of information about the two modalities by cross-modal interaction models of each of the six combination modes, and finally concatenates three groups of features (the title interaction feature, the text interaction feature, and the second interaction feature) for prediction. Through the vertical contrast experiment, it is found that the model effect is the best under the combined scene of title, text, and picture, that is, the interaction information between any two modalities can significantly enhance the model effect.

The above multi-modal fusion network combined with the relative position encoding mode can be applied to the identification of high-quality picture-textual scenes, and the modal interactivity between adjacent picture-text is crucial in this scene. Meanwhile, by introducing the relative position encoding mode, the learning of the relative position relationship between a textual sequence and a picture sequence can be enhanced, thereby improving the identification accuracy of the overall model. In addition, in the media era, there are many factors affecting the quality assessment of the article. In addition to the textual quality, the overall collocation effect between pictures and text is also crucial. The above multi-modal fusion network combined with the relative position encoding mode completes the construction of the multi-modal module in scenes of picture-textual quality identification.

In the test task of determining the quality of picture-textual content in a content center, the accuracy rate of model evaluation reaches 95%. However, the traditional supervised means for identifying high-quality picture-text, for example, when determining the quality of content only from the perspective of text, or when determining the quality of content after simply concatenating a textual embedding and a picture embedding, the dimensions considered therein are very single, and cannot learn the modal interaction information between adjacent text and picture, with the result that the overall accuracy rate is lower than 95%. Therefore, the method provided by the embodiment of this application can greatly improve the identification accuracy for article classifications.

In addition, in the above test tasks, the coverage rate of the picture-textual high-quality content reaches 17%. By performing a weighted recommendation experiment on the identified picture-textual high-quality content at the browser side, the high-quality content with good picture-textual collocation effect and excellent experience is preferentially recommended to the user, and a good service effect is obtained at the service side relative to the historical application version. Schematically, in a content processing link of a content center, content quality scores are performed on all the picture-textual contents, then the contents are ex-warehoused and distributed to a terminal side, and the terminal side performs hierarchical recommendation weighting according to the content quality scores, for example, performing recommendation weighting on identified high-quality contents, performing recommendation and weight reduction on low-quality contents, and the like. This recommendation method can effectively improve the user's reading experience, and is an innovation of recommendation algorithm based on specific business scenarios.

In addition, after performing a weighted recommendation experiment of high-quality content using the picture-textual prior high-quality identification algorithm provided in the embodiment of this application, the overall click page view (PV) on the browser side improves by 0.38%, the exposure efficiency improves by 0.43%, the click-through-rate (CTR) improves by 0.394%, and the user's stay time improves by 0.17%. At the same time, the next day retention of daily active user (DAU) increases by 0.165%. Per capita share increases by 1.705%, per capita commendation increases by 4.215%, and per capita comment increases by 0.188% in the interactive indicator data.

All the above alternative technical solutions can be combined in any manner to form alternative embodiments of the present disclosure, which will not be repeated here.

The method provided by the embodiments of this application, for textual data and picture data of an article, extracts a textual feature and a picture feature, respectively, and predicts an article classification to which the article belongs using a cross-modal interaction feature between the textual feature and picture feature. At the same time, the method considers the contribution degree of each of the textual modality and the picture modality to the article classification, rather than determining from a textual perspective only. In addition, the extracted cross-modal interaction feature is not a simple concatenation of the textual feature and the picture feature, which can reflect richer and deeper inter-modal interaction information, and help to improve the identification accuracy of the article classification. Furthermore, it can improve the discovering accuracy of high-quality articles in the scene of identifying high-quality articles.

Figure 9:
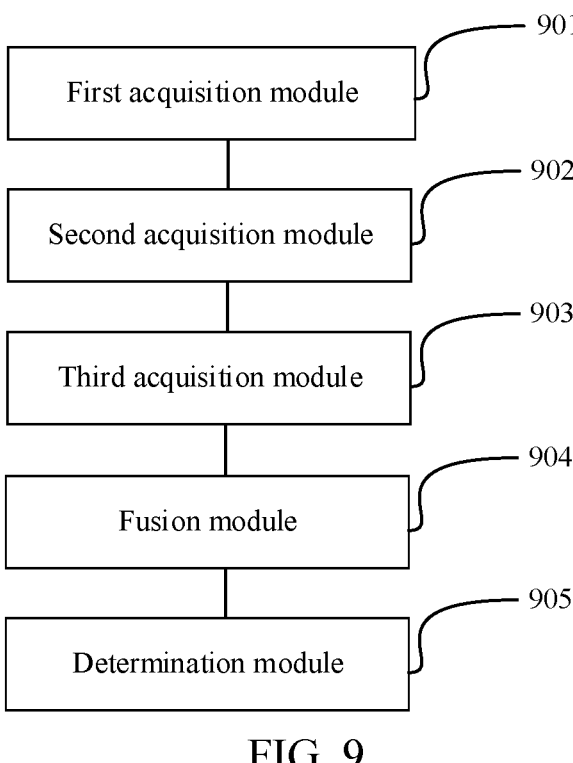
FIG. 9 is a structural diagram of a data processing apparatus provided by an embodiment of this application.

FIG. 9 is a structural diagram of a data processing apparatus provided by an embodiment of this application. Referring to FIG. 9, the apparatus includes:

a first acquisition module 901, configured to acquire a textual feature and a picture feature of an article, the textual feature being used for characterizing textual data in the article, and the picture feature being used for characterizing picture data in the article;

a second acquisition module 902, configured to determine a first interaction feature for the textual feature based on a partial feature associated with the textual feature in the picture feature, the first interaction feature being used for characterizing the textual feature fused with the picture feature;

a third acquisition module 903, configured to determine a second interaction feature for the picture feature based on a partial feature associated with the picture feature in the textual feature, the second interaction feature being used for characterizing the picture feature fused with the textual feature;

a fusion module 904, configured to fuse the first interaction feature and the second interaction feature to obtain a cross-modal interaction feature; and a determination module 905, configured to determine an article classification to which the target article belongs based on the cross-modal interaction feature.

The apparatus provided by the embodiments of this application, for textual data and picture data of an article, extracts a textual feature and a picture feature, respectively, and predicts an article classification to which the article belongs using a cross-modal interaction feature between the textual feature and picture feature. At the same time, the method considers the contribution degree of each of the textual modality and the picture modality to the article classification, rather than determining from a textual perspective only. In addition, the extracted cross-modal interaction feature is not a simple concatenation of the textual feature and the picture feature, which can reflect richer and deeper inter-modal interaction information, and help to improve the identification accuracy of the article classification. Furthermore, it can improve the discovering accuracy of high-quality articles in the scene of identifying high-quality articles.

In a possible embodiment, based on the apparatus composition of FIG. 9, the first acquisition module 901 includes:

a first extraction and fusion unit, configured to extract a textual semantic feature of the textual data, and obtain the textual feature by fusing the textual semantic feature and a textual position feature; and a second extraction and fusion unit, configured to extract a picture depth feature of the picture data, and obtain the picture feature by fusing the picture depth feature and a picture position feature.

In one possible embodiment, the textual data includes title data and text data. The textual feature includes a title feature and a textual feature.

The first extraction and fusion unit is configured to extract a title semantic feature of the title data and a text semantic feature of the text data;

obtain the title feature by fusing the title semantic feature and a title position feature; and obtain the textual feature by fusing the text semantic feature and a text position feature.

In a possible embodiment, the first interaction feature includes a title interaction feature and a text interaction feature. Based on the apparatus composition of FIG. 9, the second acquisition module 902 includes:

a first acquisition unit, configured to determine the title interaction feature for the title feature based on partial features associated with the title feature in the textual feature and the picture feature, the title interaction feature being used for characterizing the title feature fused with the textual feature and the picture feature; and a second acquisition unit, configured to determine the text interaction feature for the textual feature based on partial features associated with the textual feature in the title feature and the picture feature, the text interaction feature being used for characterizing the textual feature fused with the title feature and the picture feature.

In a possible embodiment, the first acquisition unit is configured to:

determine a first title interaction feature based on a partial feature associated with the title feature in the textual feature;

determine a second title interaction feature based on a partial feature associated with the title feature in the picture feature;

obtain a third title interaction feature by concatenating the first title interaction feature and the second title interaction feature; and obtain the title interaction feature by encoding and decoding the third title interaction feature.

In a possible embodiment, the second acquisition unit is configured to:

determine a first text interaction feature based on a partial feature associated with the textual feature in the title feature;

determine a second text interaction feature based on a partial feature associated with the textual feature in the picture feature;

obtain a third text interaction feature by concatenating the first text interaction feature and the second text interaction feature; and obtain the text interaction feature by encoding and decoding the third text interaction feature.

In a possible embodiment, based on the apparatus composition of FIG. 9, the third acquisition module 903 includes:

a third acquisition unit, configured to determine the second interaction feature for the picture feature based on partial features associated with the picture feature in the title feature and the textual feature.

In a possible embodiment, the third acquisition unit is configured to:

determine a first picture interaction feature based on a partial feature associated with the picture feature in the title feature;

determine a second picture interaction feature based on a partial feature associated with the picture feature in the textual feature;

obtain a third picture interaction feature by concatenating the first picture interaction feature and the second picture interaction feature; and obtain the second interaction feature by encoding and decoding the third picture interaction feature.

In one possible implementation, the textual position feature and the picture position feature are both relative position features between the textual data and the picture data, the relative position features being used for characterizing a sequence and distance between the textual data and the picture data.

In a possible embodiment, the determination of the relative position features includes:

determining position information in the article for a plurality of texts in the textual data and a plurality of pictures in the picture data;

constructing a relative position encoding matrix based on the position information, any element in the relative position encoding matrix being used for characterizing relative position information between a text corresponding to a column to which the element belongs and a picture corresponding to a row to which the element belongs; and determining a relative position feature between any of the plurality of texts and any of the plurality of pictures based on the relative position encoding matrix.

In one possible embodiment, the determination module 905 is configured to:

obtain a full-connection feature by performing full-connection processing on the cross-modal interaction feature;

obtain a probability prediction result of the article by performing exponential normalization on the full-connection feature, the probability prediction result including a plurality of prediction probabilities, and the plurality of prediction probabilities corresponding to a plurality of classifications; and determine the classification corresponding to the prediction probability of meeting a target condition as an article classification to which the article belongs.

All the above alternative technical solutions can be combined in any manner to form alternative embodiments of the present disclosure, which will not be repeated here.

It should be noted that the data processing apparatus provided in the above embodiments only exemplifies the division of the above functional modules when processing data. In practical application, the above functional allocation can be performed by different functional modules according to needs, that is, dividing the internal structure of a computer device into different functional modules to perform all or part of the functions described above. In addition, the above embodiment provides a data processing apparatus which belongs to the same concept as the embodiment of the data processing method, and the detailed implementation process thereof is described in detail in the embodiment of the data processing method, which will not be repeated here.

Figure 10:
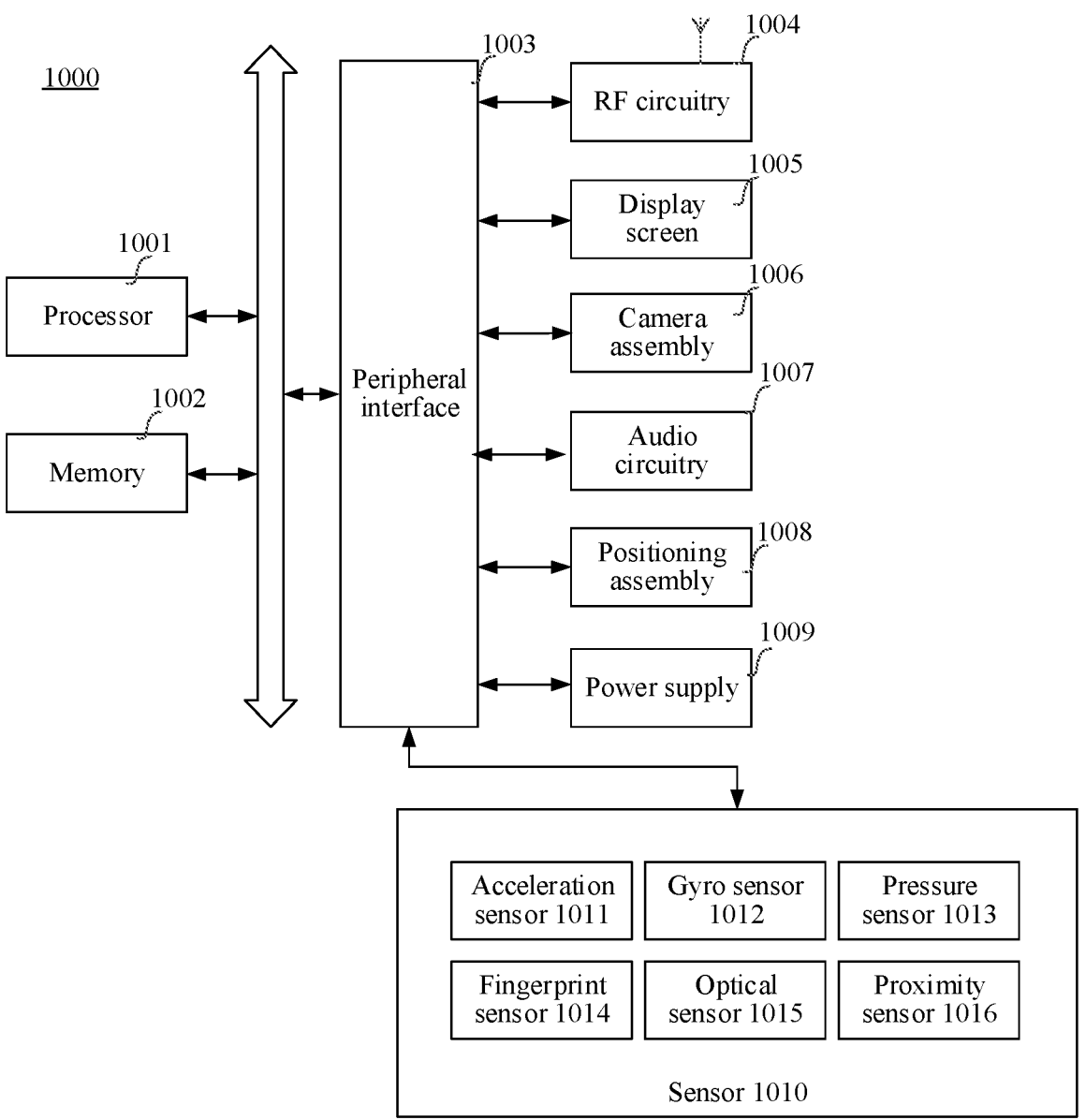
FIG. 10 is a structural diagram of a computer device provided by an embodiment of this application.

FIG. 10 is a structural diagram of a computer device provided by an embodiment of this application. With reference to FIG. 10, illustrated with the computer device as a terminal 1000, the terminal 1000 can independently complete the process of identifying the article classification of the article. In some embodiments, the device types of the terminal 1000 include smart phone, tablet, moving picture experts group audio layer III (MP3 player), moving picture experts group audio layer IV (MP4 player), laptop or desktop. The terminal 1000 may also be referred to as another name such as user equipment, a portable terminal, a laptop terminal, or a desktop terminal.

Generally, the terminal 1000 includes a processor 1001 and a memory 1002.

In some embodiments, the processor 1001 includes one or more processing cores, for example, a 4-core processor or an 8-core processor. In some embodiments, the processor 1001 is implemented in hardware in the form of at least one of digital signal processing (DSP), field-programmable gate array (FPGA), and programmable logic array (PLA). In some embodiments, the processor 1001 includes a main processor and a co-processor, where the main processor is a processor for processing data in a wake-up state, also referred to as central processing unit (CPU); a co-processor is a low-power processor for processing data in a standby state. In some embodiments, the processor 1001 is integrated with graphics processing unit (GPU), the GPU being responsible for rendering and drawing the content required by a display screen. In some embodiments, processor 1001 further includes an Artificial Intelligence (AI) processor for processing computing operations related to machine learning.

In some embodiments, the memory 1002 includes one or more computer-readable storage media. In some embodiments, the computer-readable storage medium is non-transitory. In some embodiments, the memory 1002 further includes a high-speed random-access memory, as well as a non-volatile memory, such as one or more disk storage devices and flash storage devices. In some embodiments, a non-transitory computer-readable storage medium in the memory 1002 is used for storing at least one program code executed by the processor 1001 to perform data processing methods provided by various embodiments of this application.

In some embodiments, the terminal 1000 may also include a peripheral interface 1003 and at least one peripheral. The processor 1001, the memory 1002, and the peripheral interface 1003 can be connected by a bus or signal line. Each device can be connected to the peripheral interface 1003 by a bus, signal line, or circuit board. Specifically, the device includes at least one of radio frequency (RF) circuitry 1004, display screen 1005, camera assembly 1006, audio circuitry 1007, positioning assembly 1008, and power supply 1009.

In some embodiments, the terminal 1000 further includes one or more sensors 1010. The one or more sensors 1010 include, but are not limited to an acceleration sensor 1011, a gyro sensor 1012, a pressure sensor 1013, a fingerprint sensor 1014, an optical sensor 1015, and a proximity sensor 1016.

Those skilled in the art will appreciate that the structure shown in FIG. 10 is not limiting of the terminal 1000 and can include more or fewer assemblies than shown, or combine certain assemblies, or employ different assembly arrangements.

Figure 11:
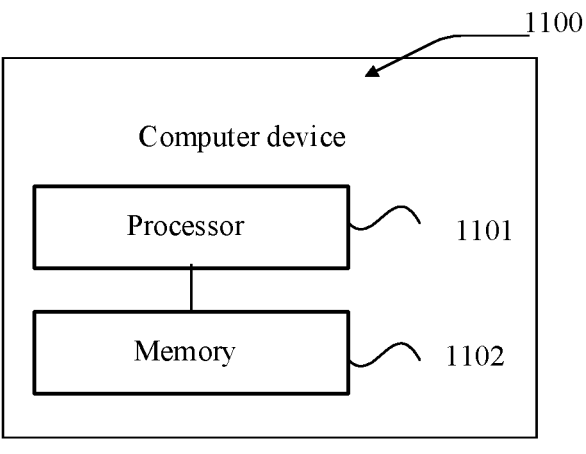
FIG. 11 is a structural diagram of a computer device provided by an embodiment of this application.

FIG. 11 is a structural diagram of a computer device provided by an embodiment of this application. The computer device 1100 may be widely different due to different configurations or performances. The computer device 1100 includes one or more processors 1101 and one or more memories 1102, where at least one computer program is stored in the memory 1102, and the at least one computer program is loaded and executed by the one or more processors 1101 to implement the data processing method provided by the various embodiments. In some embodiments, the computer device 1100 also has components such as a wired or wireless network interface, a keyboard, and an input and output interface for input and output. The computer device 1100 further includes other components for implementing device functions, which will not be described in detail herein.

In an exemplary embodiment, there is also provided a computer-readable storage medium, such as a memory including at least one computer program executable by a processor in a terminal to perform the data processing method in the various above embodiments. For example, the computer-readable storage medium includes a read-only memory (ROM), a random-access memory (RAM), a compact disc read-only memory (CD-ROM), a magnetic tape, a floppy disk, an optical data storage device, and the like.

In an exemplary embodiment, there is also provided a computer program product or computer program including one or more program codes stored in a computer-readable storage medium. The one or more processors of the computer device can read the one or more program codes from the computer-readable storage medium, and the one or more processors execute the one or more program codes, enabling the computer device to execute the data processing method in the above embodiments.

Those ordinarily skilled in the art will appreciate that all or a part of the steps for implementing the above embodiments can be completed by hardware, and can also be completed by program to instruct the relevant hardware. The program is stored in a computer-readable storage medium. In some embodiments, the storage medium mentioned above is a ROM, a magnetic or optical disk, and the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method performed by a computer device, the method comprising:

determining position information for a plurality of texts and a plurality of pictures of an article;

constructing a relative position encoding matrix based on the position information, wherein the relative position encoding matrix includes a plurality of elements, and each element of the plurality of elements represents a respective relative position information between a text, of the plurality of texts of the article, corresponding to a column to which the respective element belongs and a picture, of the plurality of pictures of the article, corresponding to a row to which the respective element belongs;

determining relative position features between the plurality of texts and the plurality of pictures based on the relative position encoding matrix, the relative position features characterizing sequences and distances between textual data corresponding to the plurality of texts of the article and picture data corresponding to the plurality of pictures of the article, wherein the relative position features include a textual feature and a picture feature of the article;

extracting a textual semantic feature of the textual data, and fusing the textual semantic feature and a textual position feature of the textual data to obtain the textual feature characterizing the textual data in the article;

extracting a picture depth feature of the picture data, and fusing the picture depth feature and a picture position feature to obtain the picture feature characterizing picture data in the article;

determining a first interaction feature for the textual feature based on a partial feature associated with the textual feature in the picture feature, wherein the first interaction feature characterizes the textual feature fused with the picture feature;

determining a second interaction feature for the picture feature based on a partial feature associated with the picture feature in the textual feature, wherein the second interaction feature characterizes the picture feature fused with the textual feature;

obtaining a cross-modal interaction feature by fusing the first interaction feature and the second interaction feature; and determining an article classification to which the article belongs based on the cross-modal interaction feature.

2. The method according to claim 1, wherein the first interaction feature comprises a title interaction feature and a text interaction feature, and determining the first interaction feature for the textual feature based on the partial feature associated with the textual feature in the picture feature comprises:

determining the title interaction feature for a title feature based on partial features associated with the title feature in the textual feature and the picture feature, the title interaction feature characterizing the title feature fused with the textual feature and the picture feature; and determining the text interaction feature for the textual feature based on partial features associated with the textual feature in the title feature and the picture feature, the text interaction feature characterizing the textual feature fused with the title feature and the picture feature.

3. The method according to claim 2, wherein determining the title interaction feature for the title feature based on the partial features associated with the title feature in the textual feature and the picture feature further comprises:

determining a first title interaction feature based on a partial feature associated with the title feature in the picture feature;

determining a second title interaction feature based on a partial feature associated with the title feature in the picture feature;

determining a third title interaction feature by concatenating the first title interaction feature and the second title interaction feature; and encoding and decoding the third title interaction feature to determine the title interaction feature.

4. The method according to claim 1, wherein the determining the second interaction feature for the picture feature based on the partial feature associated with the picture feature in the textual feature comprises:

determining the second interaction feature for the picture feature based on partial features associated with the picture feature in a title feature and the textual feature.

5. The method according to claim 1, wherein determining the article classification to which the article belongs based on the cross-modal interaction feature comprises:

obtaining a full-connection feature of the article from the cross-modal interaction feature;

obtaining a probability prediction result of the article from the full-connection feature, the probability prediction result comprising a plurality of prediction probabilities corresponding to a plurality of classifications; and determining a classification corresponding to one of the plurality of prediction probabilities meeting a target condition as an article classification to which the article belongs.

6. The method according to claim 1, wherein:

the textual data includes title data and text data; and extracting the textual semantic feature of the textual data further comprises:

extracting the title data and the text data from the textual data;

extracting a title semantic feature of the title data; and fusing the title semantic feature and a title position feature to obtain a title feature of the title data.

7. The method according to claim 1, wherein:

a dimension of the picture depth feature is different from a dimension of the picture position feature; and fusing the picture depth feature and the picture position feature to obtain the picture feature further comprises:

performing a dimension transformation on the picture depth feature to obtain a dimension-transformed picture depth feature whose dimension is the same as the picture position feature; and fusing the dimension-transformed picture depth feature and the picture position feature to obtain the picture feature.

8. The method according to claim 1, wherein:

the plurality of pictures constitutes a picture sequence; and extracting the picture depth feature of the picture data further comprises:

performing a convolution operation is performed on the picture sequence to obtain first feature map;

inputting the first feature map into a plurality of cascaded depthwise separable convolution layers of a machine learning model and obtaining a feature map, wherein each depthwise separable convolution layer of the plurality of cascaded depthwise separable convolution layers is configured to perform a respective depthwise separable convolution operation on a feature map that is output by a previous layer; and inputting the feature map into a full-connection layer of the machine learning model; and obtaining the picture depth feature of the picture data via the full-connection layer of the machine learning model.

9. A computer device, comprising:

one or more processors; and one or more memories, the one or more memories storing therein at least one computer program, and the at least one computer program being loaded and executed by the one or more processors and causing the computer device to perform operations including:

determining position information for a plurality of texts and a plurality of pictures of an article:

constructing a relative position encoding matrix based on the position information, wherein the relative position encoding matrix includes a plurality of elements, and each element of the plurality of elements represents a respective relative position information between a text, of the plurality of texts of the article, corresponding to a column to which the respective element belongs and a picture, of the plurality of pictures of the article, corresponding to a row to which the respective element belongs;

determining relative position features between the plurality of texts and the plurality of pictures based on the relative position encoding matrix, the relative position features characterizing sequences and distances between textual data corresponding to the plurality of texts of the article and picture data corresponding to the plurality of pictures of the article, wherein the relative position features include a textual feature and a picture feature of the article;

extracting a textual semantic feature of the textual data, and fusing the textual semantic feature and a textual position feature of the textual data to obtain the textual feature characterizing the textual data in the article;

extracting a picture depth feature of the picture data, and fusing the picture depth feature and a picture position feature to obtain the picture feature characterizing picture data in the article;

determining a first interaction feature for the textual feature based on a partial feature associated with the textual feature in the picture feature, wherein the first interaction feature characterizes the textual feature fused with the picture feature;

determining a second interaction feature for the picture feature based on a partial feature associated with the picture feature in the textual feature, wherein the second interaction feature characterizes the picture feature fused with the textual feature;

obtaining a cross-modal interaction feature by fusing the first interaction feature and the second interaction feature; and determining an article classification to which the article belongs based on the cross-modal interaction feature.

10. The computer device according to claim 9, wherein the first interaction feature comprises a title interaction feature and a text interaction feature, and determining the first interaction feature for the textual feature based on the partial feature associated with the textual feature in the picture feature comprises:

determining the title interaction feature for a title feature based on partial features associated with the title feature in the textual feature and the picture feature, the title interaction feature characterizing the title feature fused with the textual feature and the picture feature; and determining the text interaction feature for the textual feature based on partial features associated with the textual feature in the title feature and the picture feature, the text interaction feature characterizing the textual feature fused with the title feature and the picture feature.

11. The computer device according to claim 9, wherein determining the article classification to which the article belongs based on the cross-modal interaction feature comprises:

obtaining a full-connection feature of the article from the cross-modal interaction feature;

obtaining a probability prediction result of the article from the full-connection feature, the probability prediction result comprising a plurality of prediction probabilities corresponding to a plurality of classifications; and determining a classification corresponding to one of the plurality of prediction probabilities meeting a target condition as an article classification to which the article belongs.

12. The computer device according to claim 9, wherein: the textual data includes title data and text data; and extracting the textual semantic feature of the textual data further comprises:

extracting the title data and the text data from the textual data;

extracting a title semantic feature of the title data; and fusing the title semantic feature and a title position feature to obtain a title feature of the title data.

13. The computer device according to claim 9, wherein: a dimension of the picture depth feature is different from a dimension of the picture position feature; and fusing the picture depth feature and the picture position feature to obtain the picture feature further comprises:

performing a dimension transformation on the picture depth feature to obtain a dimension-transformed picture depth feature whose dimension is the same as the picture position feature; and fusing the dimension-transformed picture depth feature and the picture position feature to obtain the picture feature.

14. The computer device according to claim 9, wherein: the plurality of pictures constitutes a picture sequence; and extracting the picture depth feature of the picture data further comprises:

performing a convolution operation is performed on the picture sequence to obtain first feature map;

inputting the first feature map into a plurality of cascaded depthwise separable convolution layers of a machine learning model and obtaining a feature map, wherein each depthwise separable convolution layer of the plurality of cascaded depthwise separable convolution layers is configured to perform a respective depthwise separable convolution operation on a feature map that is output by a previous layer; and inputting the feature map into a full-connection layer of the machine learning model; and obtaining the picture depth feature of the picture data via the full-connection layer of the machine learning model.

15. A non-transitory computer-readable storage medium, storing therein at least one computer program, the at least one computer program being loaded and executed by a processor of a computer device and causing the computer device to perform operations including:

determining position information for a plurality of texts and a plurality of pictures of an article;

constructing a relative position encoding matrix based on the position information, wherein the relative position encoding matrix includes a plurality of elements, and each element of the plurality of elements represents a respective relative position information between a text, of the plurality of texts of the article, corresponding to a column to which the respective element belongs and a picture, of the plurality of pictures of the article, corresponding to a row to which the respective element belongs;

determining relative position features between the plurality of texts and the plurality of pictures based on the relative position encoding matrix, the relative position features characterizing sequences and distances between textual data corresponding to the plurality of texts of the article and picture data corresponding to the plurality of pictures of the article, wherein the relative position features include a textual feature and a picture feature of the article;

extracting a textual semantic feature of the textual data, and fusing the textual semantic feature and a textual position feature of the textual data to obtain the textual feature characterizing textual data in the article;

extracting a picture depth feature of the picture data, and fusing the picture depth feature and a picture position feature to obtain the picture feature characterizing picture data in the article;

determining a first interaction feature for the textual feature based on a partial feature associated with the textual feature in the picture feature, wherein the first interaction feature characterizes the textual feature fused with the picture feature;

determining a second interaction feature for the picture feature based on a partial feature associated with the picture feature in the textual feature, wherein the second interaction feature characterizes the picture feature fused with the textual feature;

obtaining a cross-modal interaction feature by fusing the first interaction feature and the second interaction feature; and determining an article classification to which the article belongs based on the cross-modal interaction feature.

16. The non-transitory computer-readable storage medium according to claim 15, wherein determining the article classification to which the article belongs based on the cross-modal interaction feature comprises:

obtaining a full-connection feature of the article from the cross-modal interaction feature;

obtaining a probability prediction result of the article from the full-connection feature, the probability prediction result comprising a plurality of prediction probabilities corresponding to a plurality of classifications; and determining a classification corresponding to one of the plurality of prediction probabilities meeting a target condition as an article classification to which the article belongs.

17. The non-transitory computer-readable storage medium according to claim 15, wherein:

the textual data includes title data and text data; and extracting the textual semantic feature of the textual data further comprises:

extracting the title data and the text data from the textual data;

extracting a title semantic feature of the title data; and fusing the title semantic feature and a title position feature to obtain a title feature of the title data.

18. The non-transitory computer-readable storage medium according to claim 15, wherein:

a dimension of the picture depth feature is different from a dimension of the picture position feature; and fusing the picture depth feature and the picture position feature to obtain the picture feature further comprises:

performing a dimension transformation on the picture depth feature to obtain a dimension-transformed picture depth feature whose dimension is the same as the picture position feature; and fusing the dimension-transformed picture depth feature and the picture position feature to obtain the picture feature.

19. The non-transitory computer-readable storage medium according to claim 15, wherein:

the plurality of pictures constitutes a picture sequence; and extracting the picture depth feature of the picture data further comprises:

performing a convolution operation is performed on the picture sequence to obtain first feature map;

inputting the first feature map into a plurality of cascaded depthwise separable convolution layers of a machine learning model and obtaining a feature map, wherein each depthwise separable convolution layer of the plurality of cascaded depthwise separable convolution layers is configured to perform a respective depthwise separable convolution operation on a feature map that is output by a previous layer; and inputting the feature map into a full-connection layer of the machine learning model; and obtaining the picture depth feature of the picture data via the full-connection layer of the machine learning model.

* * * * *